May 1, 1962 R. W. CLUKEY 3,032,191
TESTING AND SORTING APPARATUS
Filed April 20, 1959 11 Sheets-Sheet 1

INVENTOR.
RODNEY W. CLUKEY
BY
Elmer J. Nealon
ATTORNEY.

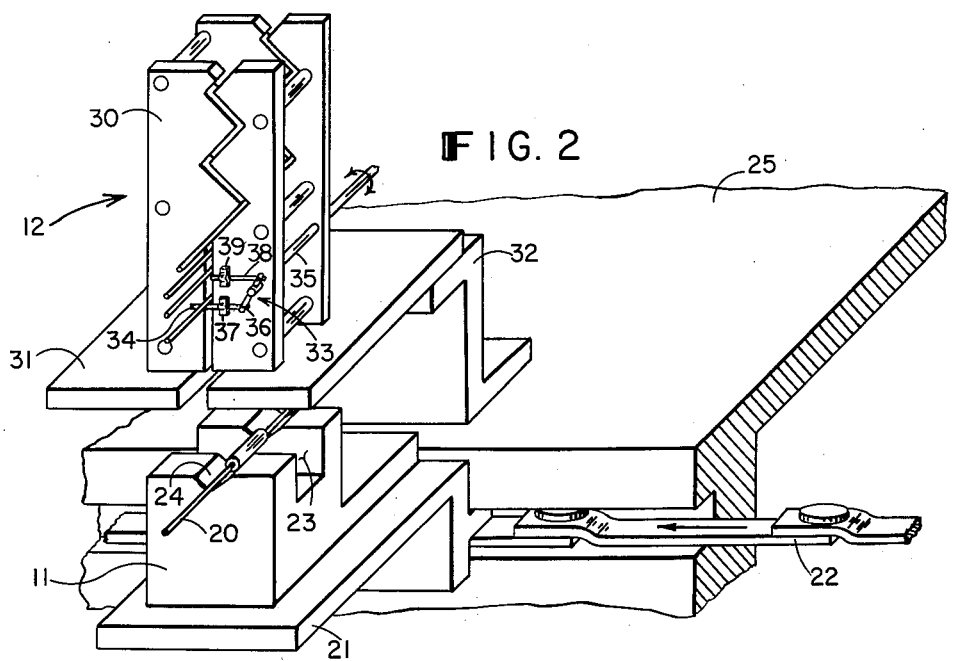
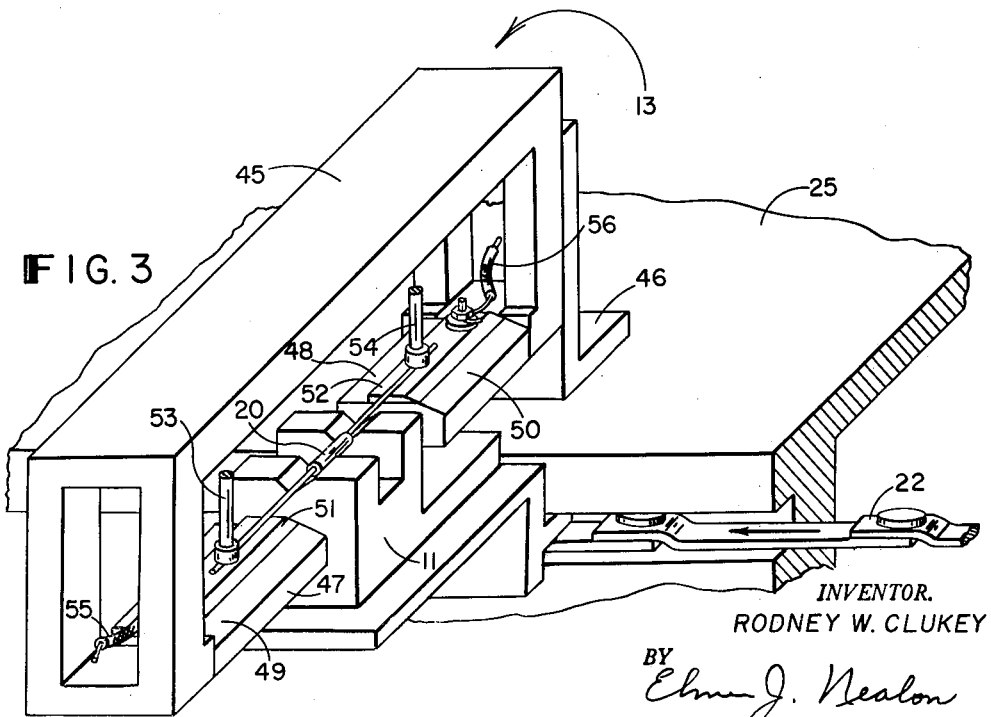

May 1, 1962 R. W. CLUKEY 3,032,191
TESTING AND SORTING APPARATUS
Filed April 20, 1959 11 Sheets-Sheet 3

INVENTOR.
RODNEY W. CLUKEY
BY
Elmer J. Nealon
ATTORNEY.

May 1, 1962 R. W. CLUKEY 3,032,191
TESTING AND SORTING APPARATUS
Filed April 20, 1959 11 Sheets-Sheet 5

INVENTOR.
RODNEY W. CLUKEY
BY
Elmer J. Nealon
ATTORNEY.

May 1, 1962 R. W. CLUKEY 3,032,191
TESTING AND SORTING APPARATUS
Filed April 20, 1959 11 Sheets-Sheet 9

INVENTOR.
RODNEY W. CLUKEY
BY Elmer J. Nealon
ATTORNEY.

INVENTOR.
RODNEY W. CLUKEY
BY Elmer J. Nealon
ATTORNEY.

United States Patent Office 3,032,191
Patented May 1, 1962

3,032,191
TESTING AND SORTING APPARATUS
Rodney W. Clukey, Melrose, Mass., assignor to Sylvania
Electric Products Inc., a corporation of Delaware
Filed Apr. 20, 1959, Ser. No. 807,550
17 Claims. (Cl. 209—75)

The present invention relates to apparatus for classifying elements according to predetermined sets of requirements. More particularly it is concerned with automatic apparatus for subjecting a plurality of elements to a series of tests and physically sorting the elements into categories according to the results of those tests.

The sorting of elements possessing a variety of characteristics into several categories, each category defined by a particular set of characteristics, is frequently a complex and expensive operation. In the manufacture of electrical semiconductor devices such as, for example, known types of germanium and silicon diodes and transistors the process of sorting fabricated units according to their electrical characteristics is of particular concern. At the present state of the art, although semiconductor devices are produced under carefully controlled uniform conditions of manufacture, devices in any one lot frequently display a fairly wide range of electrical characteristics. The characteristics of each device are tested to a plurality of sets of requirements, and each device is categorized according to one of the sets of requirements satisfied or is rejected. Typically, the testing and sorting procedures include testing one electrical parameter of each device in a batch and placing each device into one of several appropriately labeled boxes, each box covering a portion of the usable range of values for that parameter. The devices in each box are then subjected to further tests and further separated into more labeled boxes. The inevitable result of this geometric progression of boxes if more than two or three parameters are measured is believed apparent. Not only are these procedures tedious and time-consuming, but the probability of human error is extremely high.

Because of the aforementioned difficulties, three general types of automatic or semi-automatic apparatus for testing and physically sorting semiconductor devices have been devised. In one type of apparatus each device is moved in sequence from one test position to the next and tested for one characteristic at each position. A device is automatically rejected at a test position if it fails that test. Only devices possessing all the characteristics tested complete the procedure. This type of apparatus thus permits testing characteristics to only one set of requirements. A second type of apparatus has only one test position. A device is placed in position and tested to a set of characteristics. It leaves the test position and is immediately deposited at a particular location depending on the particular set of requirements its characteristics satisfy. The next device to be tested then enters the test position. In a third type of apparatus each device proceeds through a series of test positions. At each test position characteristics are tested which, if possessed by the device, satisfy one set of requirements. If a device has the desired characteristics it is automatically deposited at the test position, if not, it is moved on to the next position to be tested to a different set of requirements.

The above-mentioned types of testing and sorting apparatus are all open to certain objections which prevent their being desirably precise, efficient, and versatile. The first type requires a full complement of apparatus for each set of requirements to which devices may be tested. The second type of apparatus is limited in its speed of operation by the time required for the complete set of characteristics to be determined on each device, because only one device is under test at a time. In addition, it is generally considered desirable to apply each set of test conditions to a device for a period of time before taking a test measurement in order to insure that stable operation has been attained. Thus, apparatus of the second type is either inefficient or of dubious accuracy depending on whether or not time is allowed to permit stable operation after each change of test conditions. To a lesser extent the same difficulty is present with apparatus of the third type. In addition, for each set of requirements which includes one particular characteristic, a similar item of test equipment is needed at each of the appropriate test positions.

It is an object of the invention, therefore, to provide an improved apparatus for testing elements and physically sorting them according to the test results.

It is another object of the invention to provide an improved apparatus for testing elements to a set of characteristics and then physically sorting them into a plurality of categories depending on the characteristics each element possesses.

It is a further object of the invention to provide automatic apparatus for testing a semiconductor device to each of a set of characteristics and then depositing the device at a location designating one of a plurality of predetermined sets of requirements which is satisfied by the characteristics possessed by the device.

Briefly, in accordance with the objects of the invention apparatus is provided having testing means for subjecting elements to a test in each of a plurality of test positions. An indication of the result of each test on an element is stored by a memory means. Readout means are provided for comparing the stored results of the tests on an element with each of a plurality of sets of desired results. Output means indicate a set of desired test results satisfied by the element.

It is a feature of the invention to provide carrying means for positioning each element in each test position in sequence. Subsequent to the final test on an element, the element is removed from the carrying means and deposited by sorting means at one of a plurality of locations designating a particular set of desired test results satisfied by the element.

It is another feature of the invention to obtain indications of the test results in binary logic form. That is, the signal from each test circuit is qualitative only. The presence of a signal, or a logic "1," indicates that the test has been "passed"; and the absence of a signal, or a logic "0," indicates that the test has been "failed." The memory means, readout means, and sorting means employ logic circuit elements which operate by utilizing the test information in binary logic form.

It is also a feature of the invention to test each element for only one characteristic at each test position, and to time the test procedure so that no measurement of the characteristic is made until after the element has reached stable operation under the test conditions being applied.

Additional objects, features, and advantages of testing and sorting apparatus according to the invention will be apparent from the following detailed discussion and the accompanying drawings wherein:

FIG. 2 is a perspective view of a station on the conveyor apparatus for loading elements having axial leads into a suitable form of movable carrier;

FIG. 3 is a perspective view of a station on the conveyor apparatus for subjecting elements to an electrical test;

For purposes of explanation a semiconductor diode of particular configuration will be considered as the type of element being tested and sorted. Mechanical features of the apparatus are as shown herein in order to handle this particular diode. The apparatus as shown and described is arranged for subjecting each diode to a test of one characteristic at each of four test positions. On the basis of these four tests each diode is sorted into one of six sorting locations if it satisfies one of six preset sets of requirements or into a seventh location if it satisfies none of the sets of requirements. Extension of the number of tests to any number, N, and the number of sorting locations to any number up to $N^2$ is possible by following the teachings herein. It is believed that a description of apparatus as utilized for testing four characteristics and sorting to six sets of requirements will provide a maximum of information concerning the teachings of the invention with a minimum of duplication and possible confusion as to the true nature of the inventive contribution.

Figure 1:
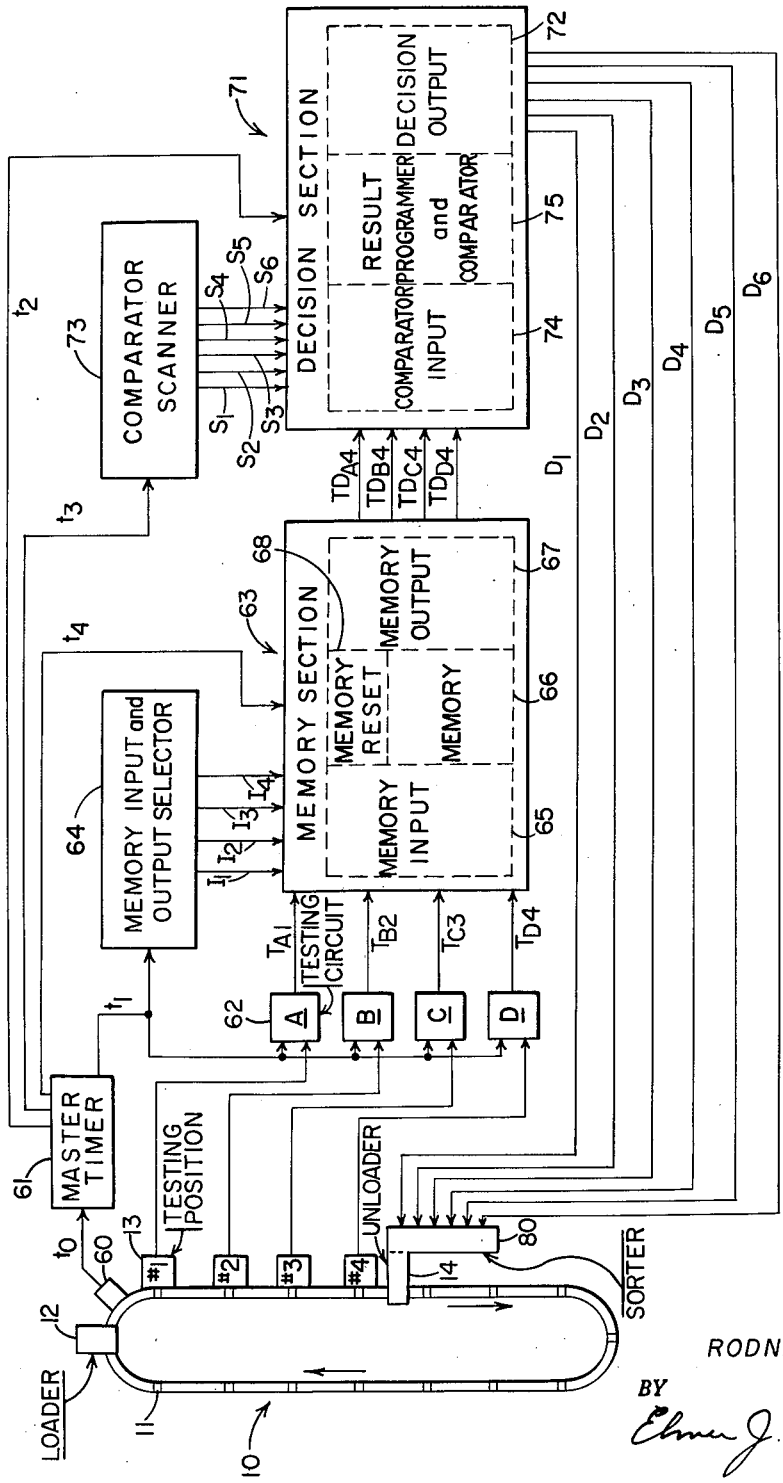
FIG. 1 is a diagrammatic representation of one embodiment of a complete testing and sorting apparatus according to the invention showing a mechanized conveyor arrangement for carrying elements to be tested and sorted and the associated electrical circuitry in functional block diagram form.

*Testing and Sorting Apparatus of FIG. 1*

Figure 4:
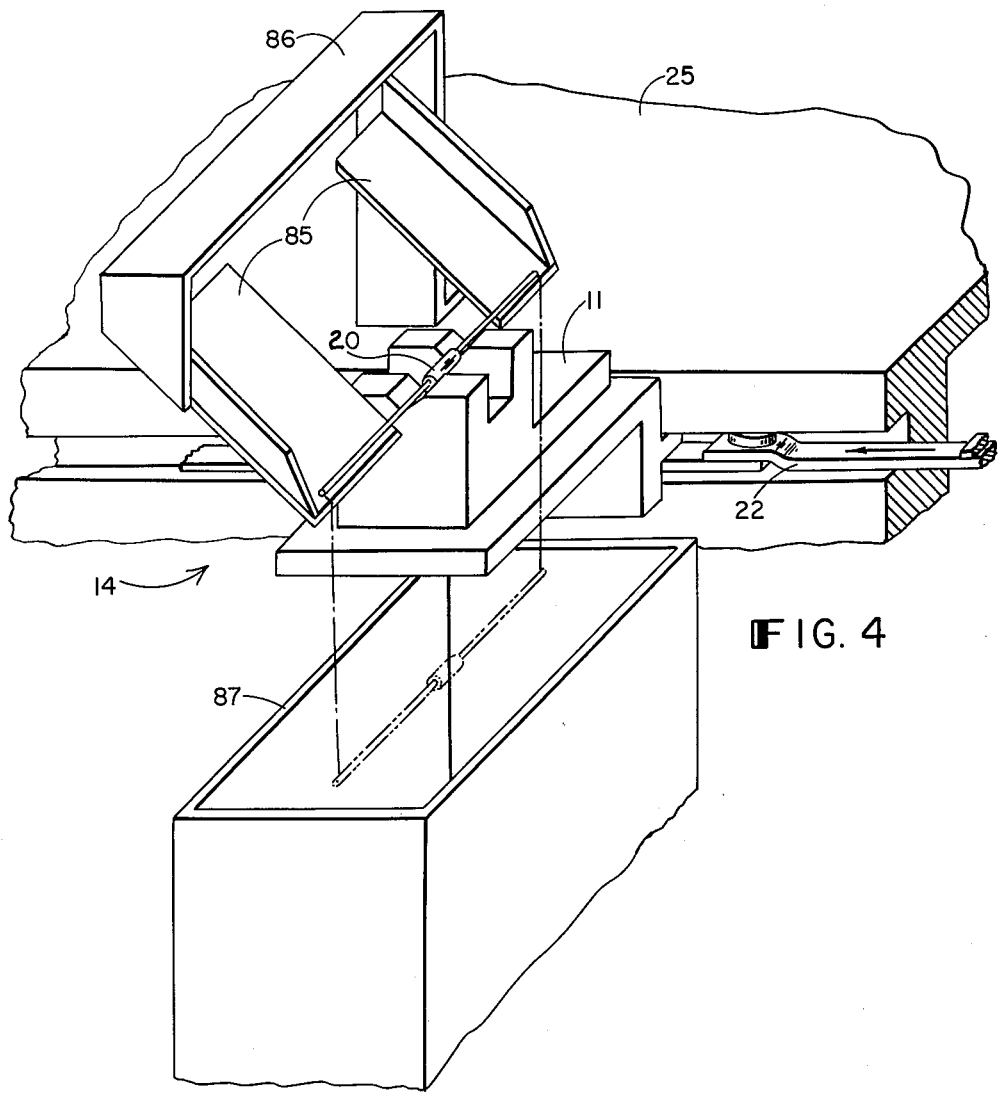
FIG. 4 is a perspective view of a station on the conveyor apparatus for unloading elements from the movable carriers.

A conveying mechanism 10 of the type shown schematically in FIG. 1 has an operating cycle which includes a dwell period and a transfer period. During the dwell period each carrier 11 of the conveyor remains fixed at a position. During the transfer period the conveyor indexes and each carrier is moved from one position to the next position in sequence. One type of conveyor which may be employed according to the invention has forty positions, a dwell time of 1.6 seconds, and a transfer time of 0.8 second. The total operating cycle is thus 2.4 seconds permitting 1,500 items to be processed through the conveyor in one hour. In the conveying apparatus shown, diodes are loaded into the carriers 11 at a loading station 12, pass through a series of test stations 13, and are removed from the carriers for sorting at an unloading station 14. These stations are shown in FIGS. 2, 3, and 4 respectively.

Diodes 20 are loaded into individual carriers 11 of suitable electrically insulating material at the loading station 12 as shown in FIG. 2. Each carrier is mounted on a support 21 which is attached to a link in the conveyor chain 22. Each carrier has a groove 23 which is wide enough to receive the body of the diode. The diode 20 is supported in the carrier by its leads which rest in the bottom of V-slots 24 in the body of the carrier. As shown in FIG. 2, the chain 22 is moved to the left with respect to the body 25 of the conveyor apparatus during the transfer period by a suitable driving means (not shown). During the dwell period, a carrier is located directly beneath the feeder track 30. The track is mounted on a plate 31 having an opening therein to permit passage of a diode from the track to the carrier. A bracket 32 supports the plate and track in proper position with respect to the conveyor body. An escapement mechanism 33 for permitting only one diode to be deposited in each carrier is mounted on the feeder track and operates in a manner to be explained hereinbelow.

Diodes are placed in the feeder track 30 by hand or from a vibratory hopper or similar apparatus located above the track. With the escapement mechanism 33 in its normal position, as shown, each lead of one diode rests on a lower arm 34 (only one of which is visible in the drawing) of the escapement mechanism. The body portion of the diode holds the next diode in position above it. During the dwell period of the cycle, after an empty carrier has been moved into position below the feeder track, rod 35 of the escapement mechanism is rotated through a small angle in a counter-clockwise direction by a suitable means (not shown). This action causes each lower arm 34 which is pivotally linked to a rod extension 36 and slidably mounted in a bracket 37 to be retracted to the right. Simultaneously each upper arm 38 which is similarly linked to the rod extension and mounted in a slide bracket 39 advances to the left. Before the lower arms 34 on each side of the track are withdrawn sufficiently to permit the lowermost diode to drop, the upper arms 38 move beneath the leads of the next diode in the track. As the bottom diode drops through the opening in the plate and into position in the carrier 11, the other diodes drop until the leads of the next diode are stopped by the upper arms 38. Rod 35 is then rotated clockwise to its original position. The upper arms 38 do not withdraw sufficiently to permit the diodes to drop until the lower arms 34 are in position to prevent further movement. Thus, for each operating cycle of the conveyor one diode is placed in a carrier by the loading station mechanism.

During the transfer period of the conveyor apparatus subsequent to the deposition of the diode in its carrier, it is carried into position at the first of the four test stations 13 as shown in FIG. 3. The station includes a housing 45 mounted in the proper position in relation to the conveyor body 25 by a bracket 46. Two blocks 47 and 48 of a suitable electrical insulating material each having a sloping face 49 and 50 are fastened to the housing in position for the sloping faces to intercept the leads of an oncoming diode while providing space between them for the carrier 11. Two metal contact plates 51 and 52 each having a sloping edge which is an extension of the sloping face of one of the blocks 47 and 48 are mounted on top of the blocks.

As the moving chain 22 brings the carrier 11 into position at the test station near the end of a transfer period, the diode leads contact the sloping faces 49 and 50 causing the diode to rise slightly as it moves along with the carrier. When the transfer motion has been completed, the carrier is in position between the blocks and the leads of the diode are resting on the metal contact plates 51 and 52. Hold-down members 53 and 54 of a non-conducting material are then actuated downward by a suitable means (not shown) to assure good electrical contact between each diode lead and the respective plate. Leads 55 and 56 connect the plates 51 and 52 to an appropriate test kit for testing the diode while it is in that particular test position.

After the test has been completed, the hold-down members 53 and 54 are withdrawn. Upon completion of the dwell period the carrier moves to the left, as shown. The diode is moved along by the carrier with the leads resting on the top surfaces of the plates 51 and 52 and blocks 47 and 48 until the diode leaves the station and the diode drops back into position in the carrier with its leads resting in the lowermost points of the V-slots. Each of the four test positions has a similar station. A diode is carried from one test position to the next one in sequence during each operating cycle of the conveyor. Apparatus for making electrical contact to the diode as disclosed herein is disclosed and claimed in a co-pending application entitled "Electrical Testing Apparatus," Serial No. 819,334, filed June 10, 1959, in the name of Alfred S. Jankowski, and assigned to the assignee of the present invention.

Figure 5:
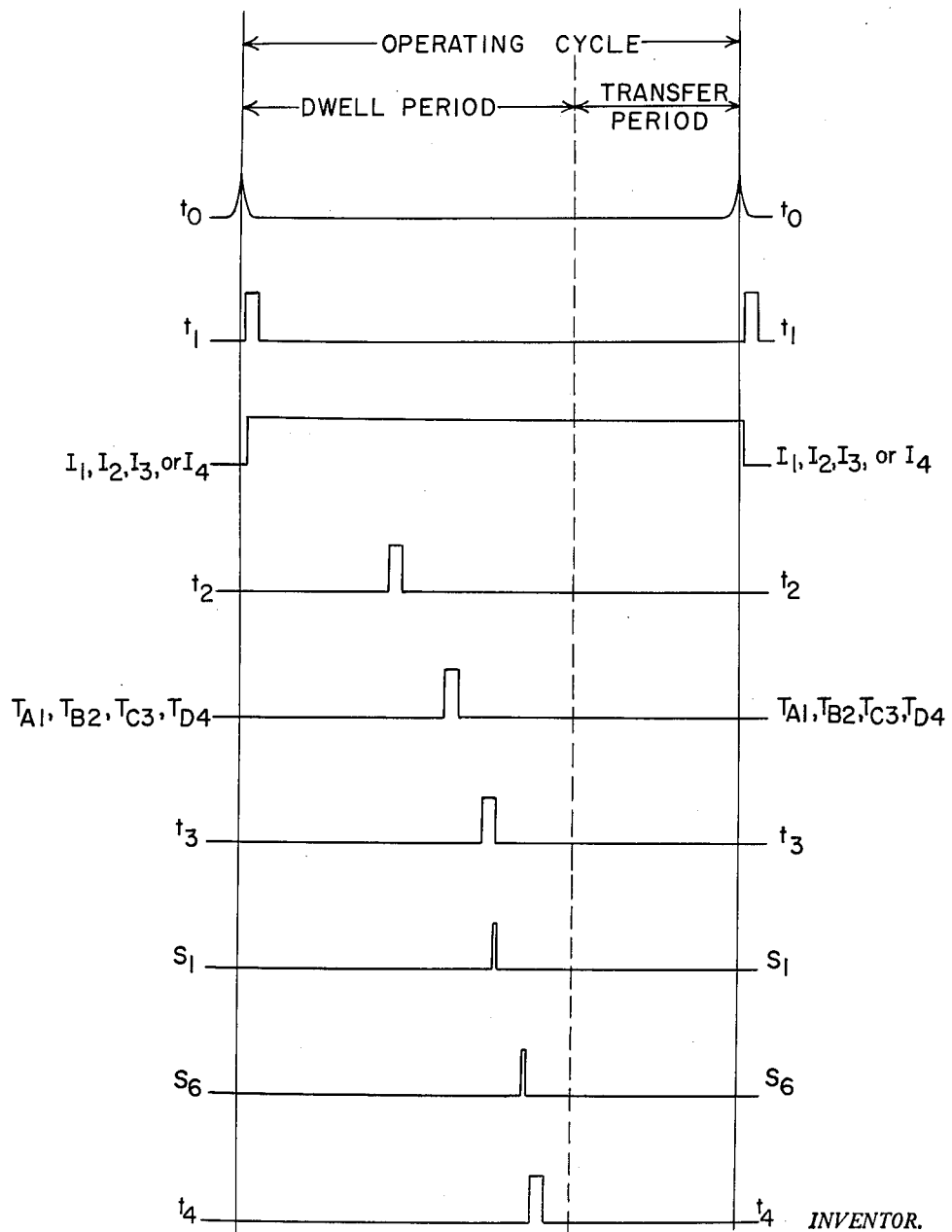
FIG. 5 is a set of graphs showing voltages occurring with respect to time during each operating cycle on the lines interconnecting various sections of the apparatus of FIG. 1.

As the conveyor mechanism 10 completes a transfer movement placing a diode in each of the test positions 13, an indexing switch 60 on the conveyor produces a signal which is fed to master timer or programmer 61 on line $t_0$. This signal starts the operating cycle of the master timer which provides or controls the electrical signals operating the electrical circuitry of the apparatus. FIG. 5 shows curves of signals to and from the master timer and other major electrical sections in order of their occurrence during an operating cycle.

Upon receipt of the starting pulse on line $t_0$, the master timer 61 produces a pulse on line $t_1$. This signal initiates a testing cycle of the diodes in the test positions 13 by the testing circuits 62. The diode in the 1 test position is subjected to test A by the A test circuit. An indication that the diode has either "passed" or "failed" that test is transmitted to the memory section 63 over line $T_{A1}$. In similar manner, and simultaneously, the diodes in the 2, 3, and 4 test positions are subjected to tests B, C, and D by test circuits B, C, and D, respectively, and an indication that each diode has "passed" or "failed" its respective test is transmitted to the memory section over each of the appropriate lines $T_{B2}$, $T_{C3}$, and $T_{D4}$.

The pulse from the master timer 61 on line $t_1$ is also fed to the memory input and output selector 64. The selector produces a steady output signal on one of its four output lines $I_1$, $I_2$, $I_3$, and $I_4$ which lead to the memory section 63. A pulse on line $t_1$ causes the output signal to switch from one output line to the next in sequence. The signal on one of the selector lines $I_1$, $I_2$, $I_3$, or $I_4$ controls the memory input 65, causing the test information on lines $T_{A1}$, $T_{B2}$, $T_{C3}$, and $T_{D4}$ to be recorded in the proper elements of the memory 66. This same signal from the memory input and output selector 64 also controls the memory output 67. Test information which has been accumulated on the results of tests A, B, C, and D for the diode currently in the 4 test position is caused to read out of the memory 66 by the memory output 67 and transmitted on lines $TD_{A4}$, $TD_{B4}$, $TD_{C4}$, and $TD_{D4}$ to the decision section 71. Before this information is transmitted, however, a pulse on line $t_2$ from the master timer clears the decision output 72 of previously recorded data.

A pulse on line $t_3$ from the master timer 61 is timed to occur after test information has been transmitted from the test circuits and recorded in the memory, and data on the diode in the 4 test position has been applied to lines $TD_{A4}$, $TD_{B4}$, $TD_{C4}$, and $TD_{D4}$. This pulse initiates the comparison cycle by activating the comparator scanner 73 which then produces one pulse in sequence on each of its output lines $S_1$ through $S_6$. These pulses in turn control the comparator input 74 and cause the data on lines $TD_{A4}$ through $TD_{D4}$ to be compared sequentially with each of the six sets of requirements preset into the result programmer and comparator 75. Coincidence of the test data on the diode in the 4 test position and a preset desired result actuates a memory element in the decision output 72, causing a steady-state signal to appear on the appropriate output line $D_1$, $D_2$, $D_3$, $D_4$, $D_5$, or $D_6$. If the test data does not satisfy any of the sets of desired results, there is no signal on any of the output lines. While the signal occurs on one of the lines $D_1$ through $D_6$, the sorter 80 is activated to cause delivery of the diode in the 4 test position to the appropriate location when the diode becomes unloaded from its carrier at the unloading station 14. The signal remains on the appropriate line, $D_1$ through $D_6$, until a pulse on line $t_2$ during the next dwell period resets the memory element. The portion of the memory 66 in which the data on the diode in the 4 test position is stored is cleared by a pulse on line $t_4$ to the memory reset 68 immediately after the comparison cycle has been completed.

As the conveyor transfers, the diode leaving the 4 test position is carried into the unloading station 14, as shown in FIG. 4. The unloader shown relies on the movement of the carrier and diode during the transfer period to effect removal of the diode from its carrier. Therefore, this station is not located at a position a carrier normally occupies during a dwell period, but rather is arranged between the 4 test position and the position to be occupied during the next dwell period. The unloader includes a split ramp 85 presenting a sloping surface to each of the leads of a diode as a carrier 11 passes between the two surfaces. The two portions of the ramp are held in position by a support bracket 86 which is fastened to the conveyor body 25. As the chain 22 conveys the carrier 11 through the split ramp, the diode leads contact the sloping faces and are moved upward while the diode advances until the diode is lifted out of the carrier. Then, as the carrier passes through the ramp, the diode slides down the ramp and drops into a hopper 87 of the sorter mechanism (not shown in FIG. 4). The diode proceeds down a chute of the sorter mechanism and is directed into one of seven locations, the entrances to which are controlled by the presence or absence, of a signal on one of the lines $D_1$ through $D_6$.

Thus, it can be seen that under conditions of usual operation, during each operating cycle a diode is loaded into a carrier on the conveyor, several diodes are each simultaneously subjected to a test in separate test positions and the test data is stored in a memory, the data on one diode which has been completely tested is compared to a plurality of sets of preset requirements, and the one diode is unloaded and deposited at a location designating a set of requirements satisfied.

*Testing Circuits*

Each testing circuit 62 may test for any one desired characteristic. The result of a test on a device is indicated in binary logic form on the appropriate output line $T_{A1}$, $T_{B2}$, $T_{C3}$, or $T_{D4}$. The apparatus shown and described provides a pulse as a binary "1," if the diode under test "passes" the test, and provides no pulse, or a binary "0," if the diode "fails" the test. One form of testing apparatus which may be used in conjunction with the present invention is a Voltage Comparison Apparatus as disclosed and claimed in application Serial No. 781,791, filed on December 19, 1958, by Robert J. Connors and assigned to the assignee of the present invention. As explained in the Connors' application a diode may be tested, for example, to determine whether or not its forward resistance under a particular set of conditions is less than a certain desired maximum value. If it possesses the desired characteristic and "passes" the test, a single pulse is produced; if it does not possess the characteristic and "fails" the test, no pulse is produced.

The testing cycle for each of the testing circuits 62 is initiated by a pulse on line $t_1$ from the master timer 61. A programmer in each of the testing circuits controls the test procedure to provide an indication of the result of the test a suitable period of time after the testing cycle has started, and also after a pulse on line $t_2$ has cleared the decision output 72. This delay insures that stable operation of the diode under the applied test conditions has been attained. Indications of the results of the tests on the respective diodes located in test positions occur on lines $T_{A1}$, $T_{B2}$, $T_{C3}$, and $T_{D4}$ as pulses, or "1's" as shown in FIG. 5, or as no pulses, or "0's."

*Memory Sections*

Figure 6:
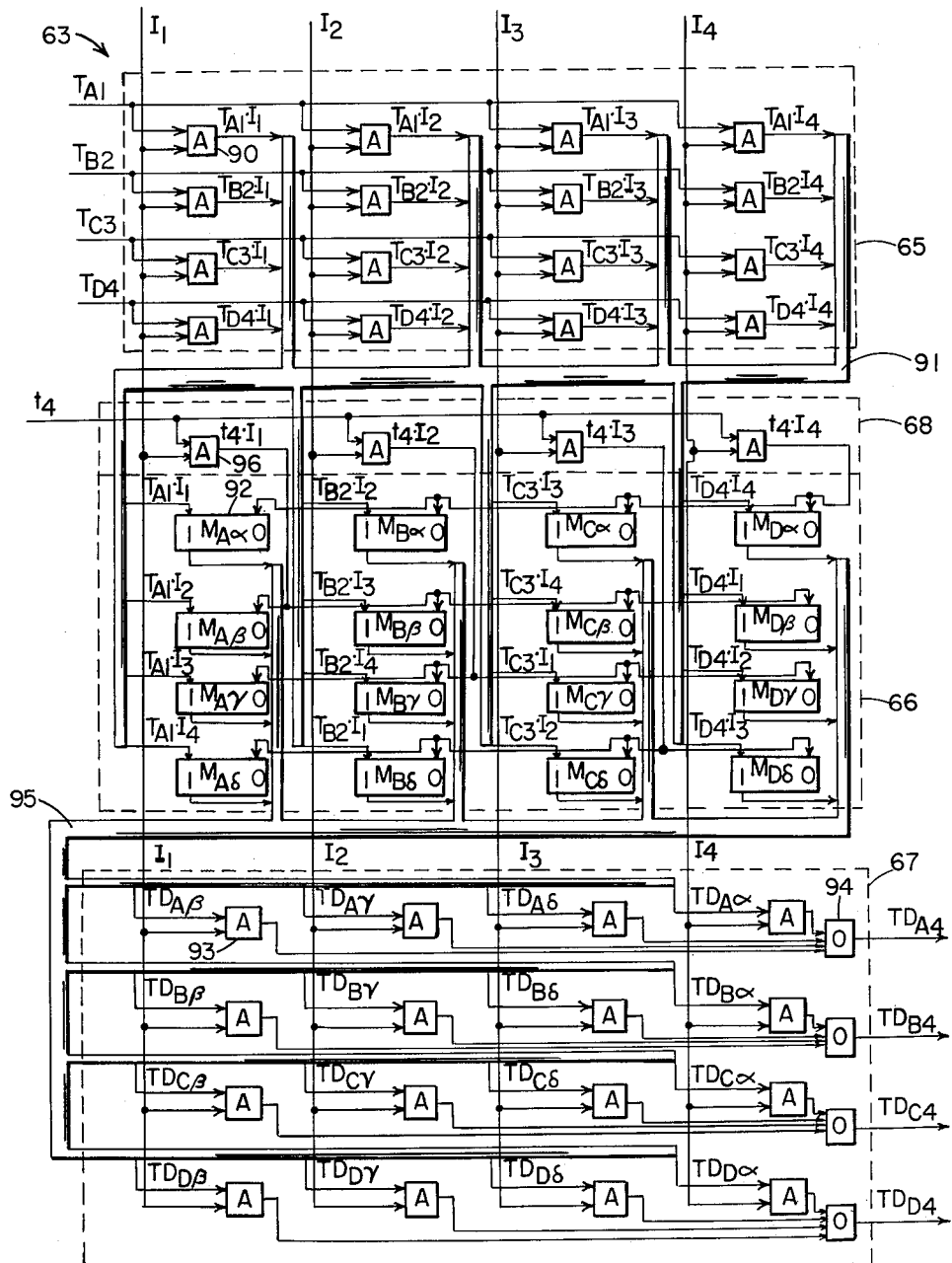
FIG. 6 is a logic diagram of the memory section of the apparatus of FIG. 1.

The indications of "pass" or "fail" for tests A, B, C, and D on the diodes in the 1, 2, 3, and 4 test positions, respectively, are transmitted to the memory section 63 by lines $T_{A1}$ through $T_{D4}$, respectively. The memory section is shown in detail in logic form in FIG. 6. This section includes the memory input 65, the memory 66, the memory output 67, and also the memory reset 68.

The memory input 65 is made up of a matrix of "and" logic circuits 90 of known type, each of which produces a signal at its output only while signals are being applied to all its inputs. Each "and" circuit has two inputs, one connected to one of the group of lines $T_{A1}$ through $T_{D4}$ and one connected to one of the group of lines $I_1$ through $I_4$ from the memory input and output selector 64. The matrix provides all possible combinations of one of each of one group of lines with one of each of the other group of lines for a total of sixteen "and" circuits. The output lines from the "and" circuits are each appropriately labeled $T_{A1} \cdot I_1$, $T_{A1} \cdot I_2$, $T_{B2} \cdot I_1$, . . . or $T_D \cdot I_4$ to indicate the coincidence of input signals required to produce an output thereon. In order to avoid confusion in the drawing the output lines from the memory input are shown leading into a multi-wire cable 91.

The cable 91 connects the output lines from the memory input to the memory 66 which is a four-by-four matrix of logic memory elements. The memory elements shown are bistable devices or flip-flops 92 of known type. Each flip-flop is represented by a rectangular block having a "1" at one side and a "0" at the other. An input signal at the "1" side triggers the device into its stable "1" state and an input signal at the "0" side triggers the device into its stable "0" state. The output line from the "1" side carries a steady signal while the flip-flop is the "1" state. For purposes of explanation, the "0" state has arbitrarily been selected as the state to which the flip-flops are set when cleared of all stored information. The flip-flops making up the memory matrix are labeled $M_{A\alpha}$, $M_{B\alpha}$, $M_{A\beta}$ . . . $M_{D\delta}$ to designate which test result on which diode is stored therein. The A, B, C, or D subscript designates the particular test, and the $\alpha$, $\beta$, $\gamma$, or $\delta$ subscript designates the particular diode. The $\alpha$, $\beta$, $\gamma$, or $\delta$ designation remains with a diode throughout its entire testing procedure as it moves from one test position to the next, and indicates whether the diode is the first, second, third, or fourth, of each group of four diodes, to proceed through the conveyor apparatus. Each of the output lines from the memory input 65 leads from the cable 91 to the "1" side of the appropriate memory flip-flop so that, for purposes of explanation, diode $\alpha$ is the diode in the 1 test position while the steady signal from the memory input and output selector is on line $I_1$.

The memory input and memory operate in conjunction with the conveyor mechanism, testing circuit, and memory input and output selector in the following manner. With diode $\alpha$ in the 1 test position and subjected to test A and with line $I_1$ energized, a signal on line $T_{A1}$ is transmitted through the appropriate "and" circuit in the memory input to flip-flop $M_{A\alpha}$, over line $T_{A1} \cdot I_1$. If diode $\alpha$ passes the A test, a pulse on line $T_{A1} \cdot I_1$ switches the flip-flop $M_{A\alpha}$ to the "1" state to record that information. If diode $\alpha$ fails the A test, no pulse appears on line $T_{A1}$ or on line $T_{A1} \cdot I_1$ and flip-flop $M_{A\alpha}$ remains in the "0" state; thus, in effect, recording that information.

After a transfer movement has taken place, diode $\alpha$ is in the 2 test position, diode $\beta$ is in the 1 test position, and the steady signal from the memory input and output selector is on line $I_2$. During the test cycle diode $\alpha$ is subjected to test B and the information on the test result passes through the memory input on lines $T_{B2}$ and $T_{B2} \cdot I_2$ to be recorded in flip-flop $M_{B\alpha}$. At the same time diode $\beta$ is subjected to test A and the information on the test results passes through the appropriate "and" circuit in the memory input on lines $T_{A1}$ and $T_{A1} \cdot I_2$ to be recorded in flip-flop $M_{A\beta}$.

In a similar manner the test data is recorded in appropriate flip-flops during subsequent operating cycles of the apparatus. When diode $\alpha$ is located in the 4 test position, memory input and output selector line $I_4$ is energized and data on test D on the diode $\alpha$ is recorded in flip-flop $M_{D\alpha}$. At the same time test C data on diode $\beta$ is being recorded in flip-flop $M_{C\beta}$, test B data on diode $\gamma$ is being recorded in flip-flop $M_{B\gamma}$, and test A data on diode $\delta$ is being recorded in flip-flop $M_{A\delta}$. Since diode $\alpha$ is in the 4 test position and all test data relative to it has been collected and recorded in flip-flops $M_{A\alpha}$, $M_{B\alpha}$, $M_{C\alpha}$, and $M_{D\alpha}$; the test data is available for comparison with the six sets of requirements in order to determine the proper sorting location for diode $\alpha$ when it is unloaded from its carrier during the next transfer period.

Information on the test results of the diode in the 4 test position is transmitted from the appropriate flip-flops to the decision section through the memory output 67. The memory output contains a matrix of sixteen "and" logic circuits 93 and four "or" logic circuits 94 of known type. Each "or" circuit has several inputs, a signal on any one of which causes a signal to appear at the output of the circuit. An output line appropriately labeled $TD_{A\alpha}$, $TD_{B\alpha}$, $TD_{A\beta}$ . . . $TD_{D\delta}$ is connected through a multi-wire cable 95 from the "1" output of each of the memory flip-flops to an "and" circuit in the memory output. Memory input and output selector lines $I_1$ through $I_4$ are connected to the "and" circuits to permit transmission through the "and" circuits of the test data on the diode in the 4 test position. For example, when diode $\alpha$ is in the 4 test position line $I_4$ is energized. Therefore, $I_4$ is connected to the same "and" circuits as lines $TD_{A\alpha}$, $TD_{B\alpha}$, $TD_{C\alpha}$, and $TD_{D\alpha}$. The outputs from the "and" circuits for the A test data on all four diodes are connected as inputs to one "or" circuit. Similar "or" circuits are also provided for the B, C, and D test data "and" circuits. However, since there is never more than one input signal to each "or" circuit during any one operating cycle because of the action of the "and" circuits in conjunction with selector lines $I_1$ through $I_4$, the only real function of the "or" circuits is to isolate the "and" circuit outputs from each other. The memory output controlled by selector lines $I_1$ through $I_4$ thus permits the test data on the diode in the 4 test position to be transmitted from the appropriate memory flip-flops to the decision section 71 on lines $TD_{A4}$, $TD_{B4}$, $TD_{C4}$, and $TD_{D4}$.

Although the memory reset 68 does not function while test data is being recorded in or read out out of the memory, its purpose and manner of operation is most clearly explained at this point in the discussion. The memory reset contains four "and" circuits 96 each having two inputs. Selector lines $I_1$ through $I_4$ are each connected as inputs to different "and" circuits. All of the "and" circuits are connected to line $t_4$ from the master timer 61 which produces a pulse on the line toward the end of each dwell period after the testing and comparison cycles are completed. Each of the "and" circuit output lines is connected to the "0" inputs of four of the memory flip-flops. The connections from the "and" circuits are made to appropriate flip-flops so that when a pulse is applied to line $t_4$ it is transmitted through the proper "and" circuit as determined by the energized selector line $I_1$ through $I_4$ to set to the "0" state the flip-flops having data on the diode in the 4 test position stored therein. For example, the "and" circuit having an input connected to line $I_4$ has its output connected to flip-flops $M_{A\alpha}$, $M_{B\alpha}$, $M_{C\alpha}$, and $M_{D\alpha}$. Thus, after the test data stored on diode $\alpha$ has been scanned for comparison, a reset pulse on line $t_4$ is directed to the proper flip-flops to clear the flip-flops and prepare them for recording data on the diode which will be in the "1" test position during the subsequent dwell period.

Decision Section

Figure 7:
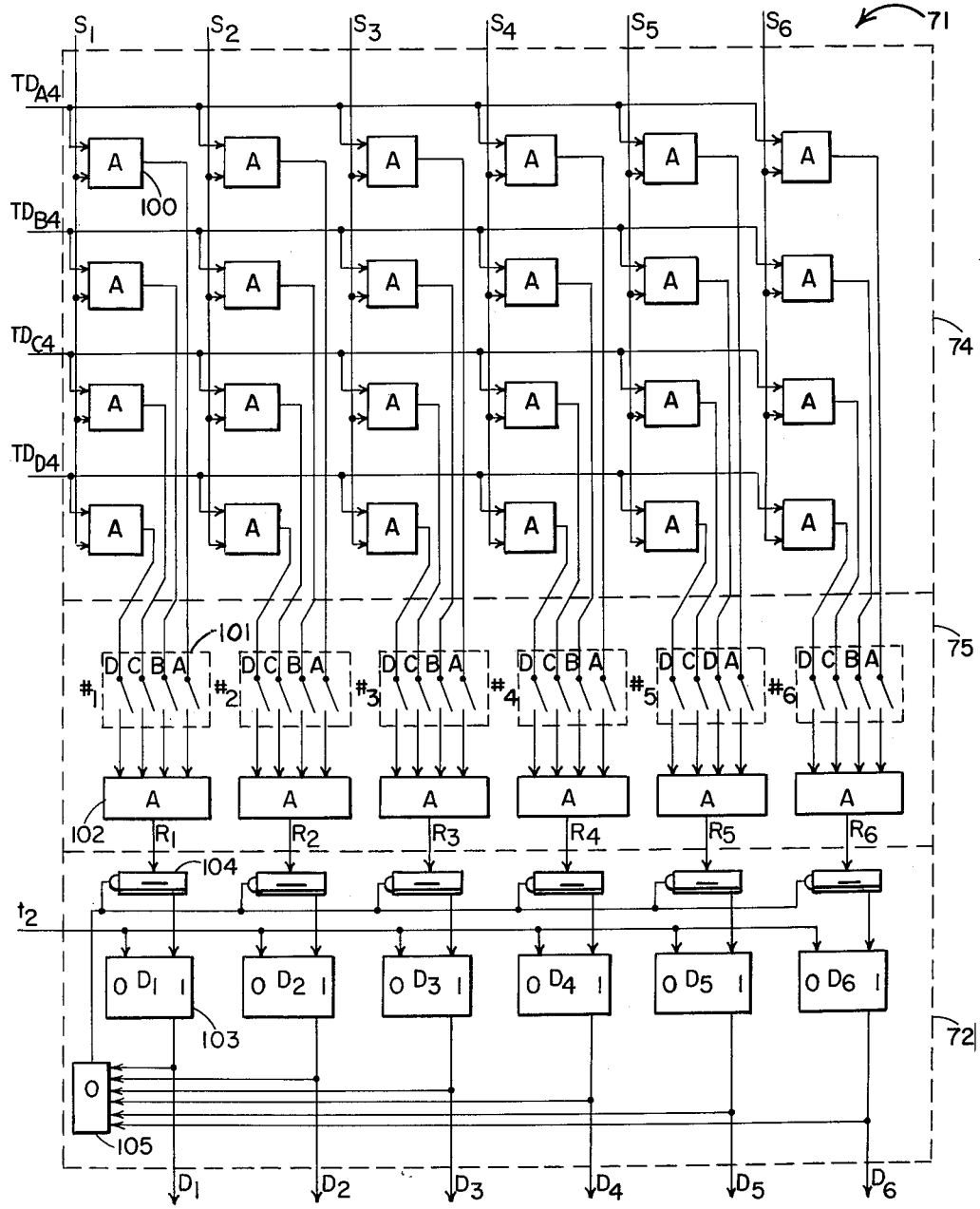
FIG. 7 is a logic diagram of the decision section of the apparatus of FIG. 1.

The test data on the diode in the 4 test position is transmitted on lines $TD_{A4}$, $TD_{B4}$, $TD_{C4}$, and $TD_{D4}$ to the decision section 71, the logic diagram for which is shown in FIG. 7. This section includes a comparator input 74, a result programmer and comparator 75, and a decision output 72. The test data is compared with each of six sets of requirements, or desired test results, which have been preset into the result programmer. Depending upon the set of requirements satisfied by the test data, a signal appears on one of output lines $D_1$ through $D_6$. If none of the sets of requirements are satisfied, there is no output signal.

The comparator input 74 contains a four-by-six matrix of "and" logic circuits 100. Each of lines $TD_{A4}$, $TD_{B4}$, $TD_{C4}$, and $TD_{D4}$, is connected to six of the "and" circuits. Each of lines $S_1$ through $S_6$ from the comparator scanner 73 is connected to four of the "and" circuits which are each connected to a different one of lines $TD_{A4}$ through $TD_{D4}$. The output lines from the four "and" circuits to which one of the scanner lines is connected form a group which transmits data on tests A, B, C, and D on the diode in the 4 test position when a signal appears on that scanner line. A similar grouping of the output lines from the "and" circuits connected to each of lines $S_1$ through $S_6$ provides a total of six separate groups each transmitting the test data when the appropriate scanner line is energized.

Each of the six sets of four lines which transmits the outputs from the comparator input leads through a bank of switches 101 to an "and" circuit 102. A switch is connected in series in each of the lines. This arrangement forms the result programmer and comparator 75. A set of requirements or a desired result, is programmed for each group of four lines by the settings made of the switches in the appropriate bank. For example, if one of the sets of requirements is that all four tests A, B, C, and D be passed by the diode, then all four switches in a bank must be closed. If one of the sets of requirements is that tests A, B, and D be passed, then in one bank those three switches are closed and the C switch is opened. A signal must be present on all the lines in a group in which switches have been closed in order for an output signal to be transmitted by the "and" circuit of that group. An open switch in a line to an "and" circuit prevents that line from affecting the "and" circuit regardless of whether or not a signal occurs thereon.

The result programmer and comparator operates in conjunction with the comparator scanner and comparator input to provide an output on each of lines $R_1$ through $R_6$ for each set of requirements which is satisfied by the diode in the 4 test position. After the testing cycle has been completed and the complete data on the diode in the 4 test position is being transmitted on lines $TD_{A4}$ through $TD_{D4}$, a pulse on line $t_3$ from the master timer 61 starts the comparison cycle by activating the comparator scanner 73. The comparator scanner then produces a pulse on each of its output lines $S_1$ through $S_6$ in sequence. If the test data on the diode meets all the requirements set into the 1 bank of switches, a pulse appears on line $R_1$ while line $S_1$ is energized. If the diode meets all the requirements set into the 2 bank of switches, a pulse appears on line $R_2$ while line $S_2$ is energized. Comparison of the test data with each set of requirements is thus made during the sequence of pulses on lines $S_1$ through $S_6$. An output pulse is transmitted on one or more appropriate comparator output lines $R_1$ through $R_6$ when coincidence exists between the test results and one or more sets of programmed desired results. It is obvious that the test data on a diode may satisfy more than one set of requirements and thus cause signals to appear on two or more of the lines $R_1$ through $R_6$. For example, a diode which has passed all four tests will cause signals to appear on all six comparator output lines since it satisfies all possible sets of requirements. For reasons which will be apparent from the discussion hereinbelow of the decision output, the most desirable of the six sets of requirements is programmed in the 1 bank of switches and the least desirable of the six sets is programmed in the 6 bank of switches.

Comparison output lines $R_1$ through $R_6$ transmit the information on the sets of requirements satisfied by the diode in the 4 test position to the decision output 72. The decision output contains six flip-flops 103, designated $D_1$ through $D_6$ which serve as memory elements. The flip-flops are combined with suitable logic circuitry so that only the one flip-flop connected to the comparator output line indicating the most desirable set of requirements satisfied is triggered to the "1" state. The logic arrangement includes an "unless" circuit 104 connected between each comparator output line $R_1$ through $R_6$ and the appropriate flip-flop. The outputs from the "1" sides of the flip-flops are connected to an "or" circuit 105, the output of which is the inhibiting connection to each of the "unless" circuits. Thus, as soon as any of the flip-flops $D_1$ through $D_6$ is triggered to the "1" state, a signal is transmitted to all the "unless" circuits preventing later occurring signals on any comparator output line from having any effect on the flip-flops. Since signals are transmitted sequentially over the comparator output lines from $R_1$ to $R_6$, the most desirable set of requirements must be set in the 1 bank of switches in the result programmer. For example, if in the 1 bank of switches A, B, and C were closed and in the 2 bank of switches A, B, C, and D were closed, diodes passing tests A, B, C, and D would cause flip-flop $D_1$ to be triggered first and thus flip-flop $D_2$ could not be triggered.

Figure 8:
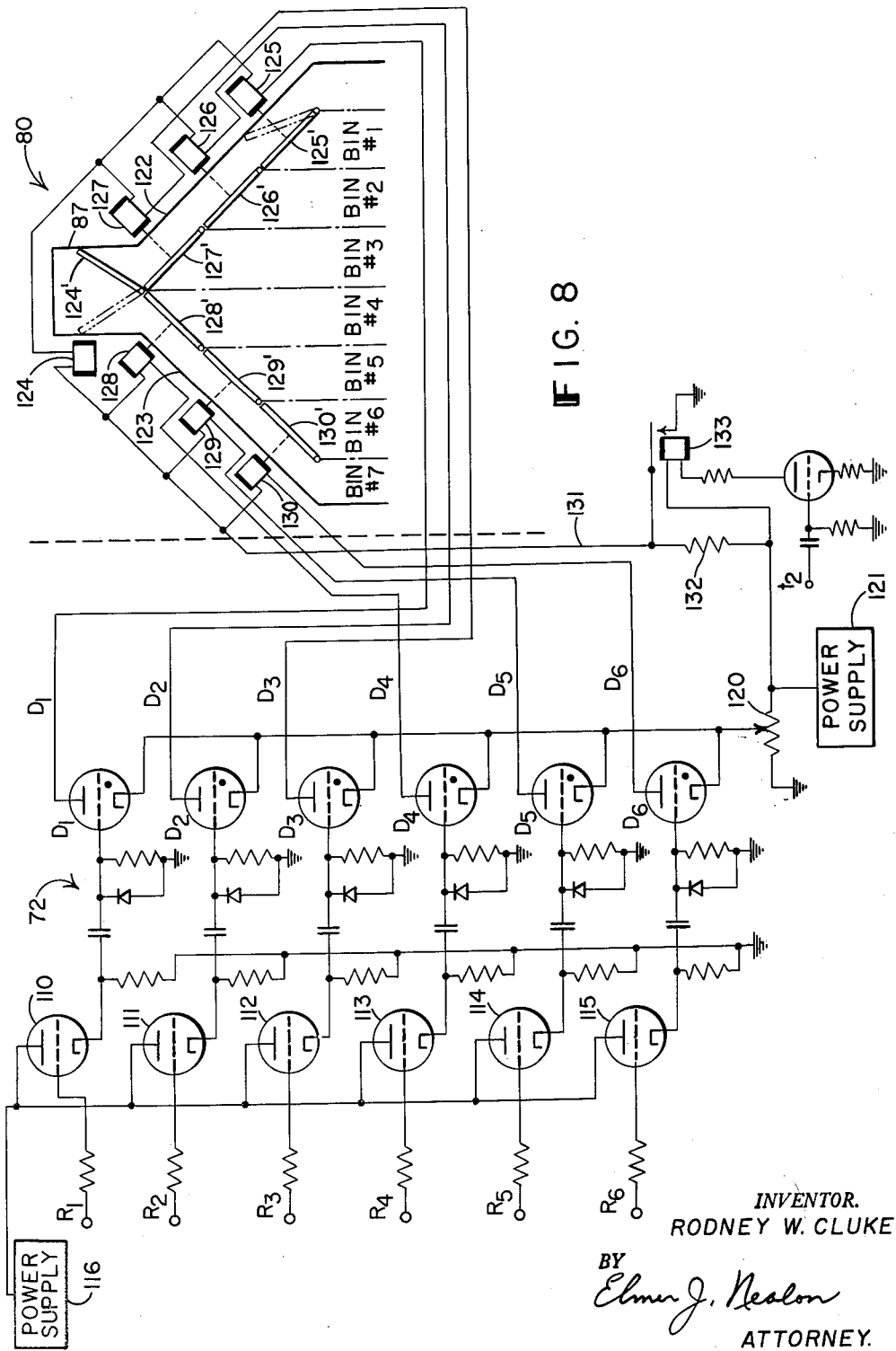
FIG. 8 is a schematic diagram of the decision output stage circuitry and of the sorter mechanism of the apparatus of FIG. 1.

The steady output signal on one of lines $D_1$ through $D_6$, or the lack of any signal, controls the sorter mechanism 80, representation of which is shown in FIG. 8, so as to direct the diode which drops during the next transfer period to one of seven sorting locations. The signal remains on the decision output line until after the next transfer period, during which the diode in the 4 test position is unloaded as explained hereinabove. A pulse occurs on line $t_2$ from the master timer 61 to reset the flip-flop to the "0" state during the next dwell period just prior to the transmission of test data from the testing circuits 62 to the memory section 63 over lines $T_{A1}$ through $T_{D4}$.

A circuit for the decision output 72 employing gas-filled thyratrons as the flip-flop elements is shown together with a diagrammatic representation of the sorter mechanism 80 in FIG. 8. Each of the comparator output lines $R_1$ through $R_6$ is coupled through a resistance to the grid of a triode amplifier vacuum tube 110 through 115, respectively, employed as a cathode follower. The anodes of the triodes are connected in common to a power supply 116, and the cathodes are connected through individual resistances to ground. Each cathode is also coupled to the grid of one of thyratrons $D_1$ through $D_6$ by means of a series capacitance and a shunted grid biasing network. The cathodes of the thyratrons are connected in common to the movable contact of a potentiometer 120 which serves as a voltage divider between a second power supply 121 and ground and provides the cathode biasing potential.

Each thyratron anode is connected by its output line $D_1$ through $D_6$ to a solenoid arrangement which controls a gate arrangement for providing an entrance from the hopper 87 to one of the bins or sorting locations off the chutes 122 and 123. A solenoid 124 controls a gate 124' which opens the entrance from the hopper 87 to one or the other of the chutes 122 and 123. Each of the other solenoids 125 to 130 controls a gate 125' to 130' controlling an entrance to a bin from a chute. In the diagram of FIG. 8 the gates are shown in their normal positions with their associated solenoids not energized. Each of the solenoids, when energized, causes its associated gate to pivot toward the solenoid to provide entrance to the chute or bin the gate normally closes. Output lines $D_1$, $D_2$ and $D_3$ are connected to solenoids 125, 126, and 127, respectively. These three solenoids are then connected in common through solenoid 124 to a common lead 131. Output lines $D_4$, $D_5$ and $D_6$ are connected through solenoids 128, 129, and 130, respectively, directly to the common lead 131. The common lead is connected through a resistance 132 to the second power supply 121 to complete the thyratron anode circuits. When a thyratron is conducting, current flows through the solenoid, or solenoids, in its anode circuit and causes the associated gate, or gates, to pivot and open the entrance to the proper bin to the exclusion of all other bins. When none of the thyratrons is conducting, the entrance to bin 7 is open.

The apparatus shown in FIG. 8 operates in the following manner. A positive pulse on any one of the comparator output lines $R_1$ through $R_6$ is coupled through a cathode follower to the grid of the appropriate thyratron. The thyratron is thus triggered on, or to the "1" stable state. Current flow through the thyratron anode circuit causes the solenoid arrangement in the circuit to be energized thus activating the proper gate arrangement. The current flow in the anode circuit also flows through a portion of the potentiometer 120. This action increases the potential on the cathodes of all the thyratrons sufficiently to prevent further input pulses on lines $R_1$ through $R_6$ from triggering any of the remaining thyratrons. The thyratron which is already conducting is not affected. The circuit as described thus provides the desired functions of the "or" and "unless" logic arrangement of FIG. 7.

The thyratron which is conducting remains conducting and maintains its associated solenoid active until a reset pulse is applied to line $t_2$. As has been explained hereinabove a pulse is not applied to line $t_2$ until after the diode has been unloaded and deposited in a bin during the next transfer period. The thyratron is turned off, or reset to the "0" state, by the action of a relay 133 which shorts out the second power supply 121 and grounds the thyratron anodes.

*Memory Input and Output Selector and Comparator Scanner*

Figure 9:
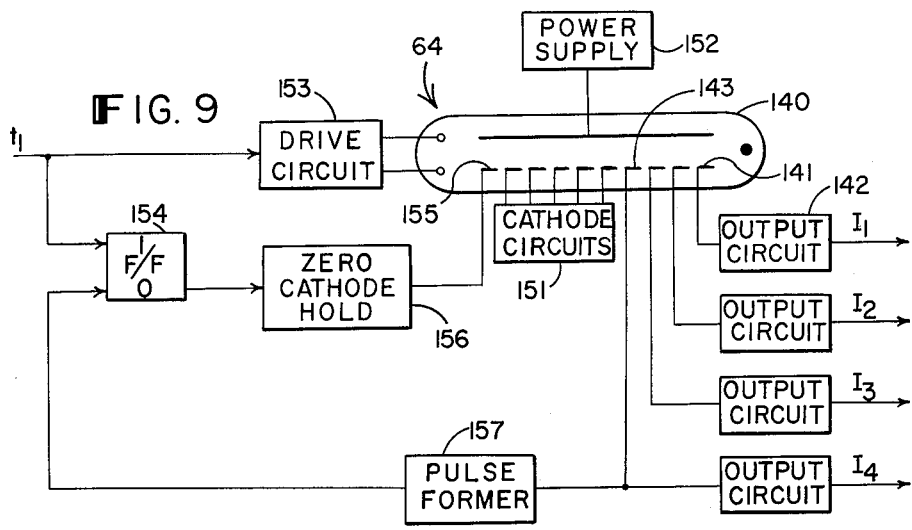
FIG. 9 is a diagrammatic representation of the memory input and output selector of the apparatus of FIG. 1.
Figure 10:
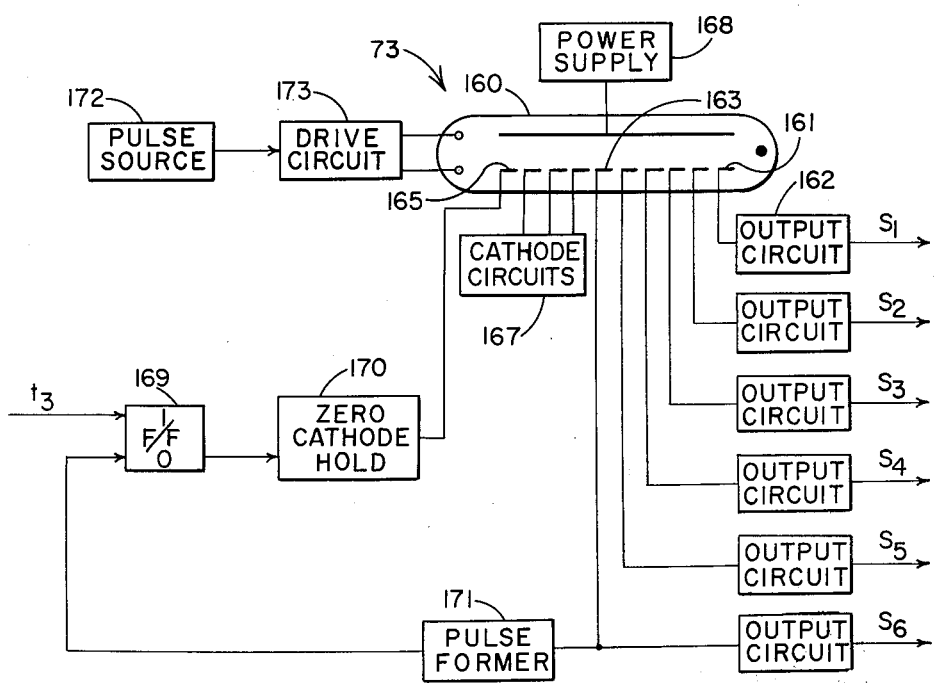
FIG. 10 is a similar diagrammatic representation of the comparator scanner of the apparatus of FIG. 1.

Diagrammatic representations of the memory input and output selector 64 and the comparator scanner 73 are shown in FIGS. 9 and 10, respectively. In each of these circuits an output signal is provided in sequence on each one of a set of output lines. In the memory input and output selector the signal is switched from one output line to the next for each pulse on line $t_1$. In the comparator scanner in response to a single pulse on line $t_3$ the signal is applied to the first output line, switched in sequence to all the output lines, and then turned off. Both circuits operate by employing gas-filled, two-guide glow transfer counting tubes according to the teachings in Patent No. 2,864,034, issued to John E. Adams on December 9, 1958, and assigned to the assignee of the present invention. A suitable tube for this purpose is a ten position Sylvania Type 6476 gas counter tube.

In the memory input and output selector 64 of FIG. 9 a two guide glow transfer counting tube 140 of the above-mentioned type is shown having its first cathode 141 connected through a suitable output circuit 142 to line $I_1$. The second, third, and fourth cathodes are similarly connected through output circuits to lines $I_2$, $I_3$, and $I_4$ respectively. Cathodes five through nine, which are superfluous in the specific embodiment of the invention herein described, are connected to suitable circuits 151 which functionally isolate these cathodes from the other elements of the tube. The anode of the counting tube is connected to a suitable power supply 152. Line $t_1$ is connected to the two sets of guide electrodes through a drive circuit 153 which changes an input pulse on line $t_1$ to a separate pulse on each set of guide electrodes thereby causing transfer of the glow from one cathode to the next. A suitable flip-flop 154 is connected to the zero cathode 155 through a zero cathode hold circuit 156 so that when the flip-flop is in the "0" state, the zero cathode will draw the glow from any other cathode and hold it. The fourth cathode 143 is connected to the "0" input of the flip-flop through a pulse former 157 which causes the flip-flop to switch to the "0" state as the glow leaves the fourth cathode. Line $t_1$ is also connected to the "1" input of the flip-flip.

The circuit operates to provide a steady signal on one of the output lines $I_1$ through $I_4$ depending on which of the cathodes has the glow. Each pulse from the master timer on line $t_1$ causes the glow to move from one cathode to the next cathode in the known manner. When the glow is on the fourth cathode 143 and a pulse occurs on line $t_1$ the glow starts to leave the cathode and move to the first guide electrode adjacent thereto. As this happens the pulse former 157 causes the flip-flop to switch immediately to the "0" state. The output from the flip-flop to the zero cathode hold circuit 156 causes the zero cathode 155 to take the glow. This action occurs very rapidly relative to the length of time the pulse remains on line $t_1$. Therefore, the pulse on line $t_1$ switches the flip-flop back to its "1" state permitting the glow to leave the zero cathode, and through the action of the drive circuit to be transferred to the adjacent cathode, the first cathode 141. In this way the five nonessential main cathodes are prevented from interfering with the desired orderly operation of the four main cathodes from which the selector output lines are energized.

The comparator scanner 73 as shown in FIG. 10 provides one output pulse in sequence on each of lines $S_1$ through $S_6$ when a single initiating pulse is supplied on line $t_3$ by the master timer. A glow transfer counting tube 160 of the same type as that employed in the memory input and output selector has its first cathode 161 connected to line $S_1$ through an output circuit 162. Cathodes two through six are similarly connected through output circuits to lines $S_2$ through $S_6$. Cathodes seven, eight, and nine, which are superfluous in the specific embodiment herein described, are connected to suitable circuits 167. As in tube 140 in the above-described memory input and output selector circuit of FIG. 9, it is necessary also to functionally isolate these unused cathodes. The anode of the counter tube is connected to a power supply 168. A flip-flop 169 has its "0" output connected to a zero cathode hold circuit 170 which, in turn, is connected to the zero cathode 165. The sixth cathode 163 is connected through a pulse former 171 to the "0" input of the flip-flop so that as the glow leaves the sixth cathode, the flip-flop is switched to the "0" state. The comparator scanner differs from the memory input and output selector in that the pulses which operate the circuit are not applied to both the "1" side of the flip-flop and the drive circuit. A free-running pulse source 172 which constantly delivers pulses is connected to the two sets of guide electrodes through the usual type of drive circuit 173. The pulse source may be, for example, a 60 cycle per second sinusoidal signal source. The flip-flop 169 is switched to the "1" state by the occurrence of a pulse on line $t_3$ from the master timer.

Although the pulse source 172 and drive circuit 173 provides signals to transfer the glow from one cathode to another, the glow remains on the zero cathode as long as the flip-flop 169 is in its "0" state. A comparison cycle is started by a pulse from the master timer on line $t_3$ at the proper time during the operating cycle. The pulse switches the flip-flop to the "1" state and permits the glow to leave the zero cathode. Each pulse from the pulse source 172 then causes the glow to be transferred from one cathode to the next in sequence. A signal appears on each of the output lines $S_1$ through $S_6$ while the glow is on the associated cathode. As the glow leaves the sixth cathode 163, the flip-flop is triggered to its "0" state by the action of the pulse former 171. The glow immediately transfers to the zero cathode 165 and remains there, despite the presence of signals from the pulse source, until it is released by a pulse on line $t_3$ during the next operating cycle.

The glow transfer tubes available commercially generally have no more than ten cathodes. If more than ten tests are conducted on the elements being tested and sorted, two or more counting tubes operating in sequence are employed in the memory input and output selector. If the elements are to be tested to more than nine sets of requirements, two or more counting tubes are employed in the comparator scanner. The apparatus of FIGS. 9 and 10 are expanded according to the teachings in the aforementioned patent to Adams in order to obtain additional outputs.

In expanding the memory input and output selector, the apparatus of FIG. 9 is duplicated for each nine outputs required. Line $t_1$ is connected to the drive circuit for each of the counting tubes but is not connected to a flip-flop. The flip-flops are inter-connected so that as one of them is switched from the "1" to the "0" state by the glow leaving the last cathode of its associated counting tube, the next flip-flop in the sequence is switched to the "1" state thus releasing the glow from the zero cathode of its associated counting tube.

The comparator scanner is expanded by duplicating the apparatus of FIG. 10 for each nine outputs required. One pulse source is connected to the drive circuit of each counting tube, but has no effect except on a counting tube the associated flip-flop of which is in the "1" state. Input line $t_3$ is connected to only the first flip-flop. The flip-flops are connected in series so that when a flip-flop is switched to the "0" state as the glow leaves the last cathode of its associated counting tube, the next flip-flop in the series is switched to the "1" state thus releasing the glow from the zero cathode of its associated counting tube. The last flip-flop in the series is not connected to the first flip-flop as is done in the memory input and output selector.

Figure 11:
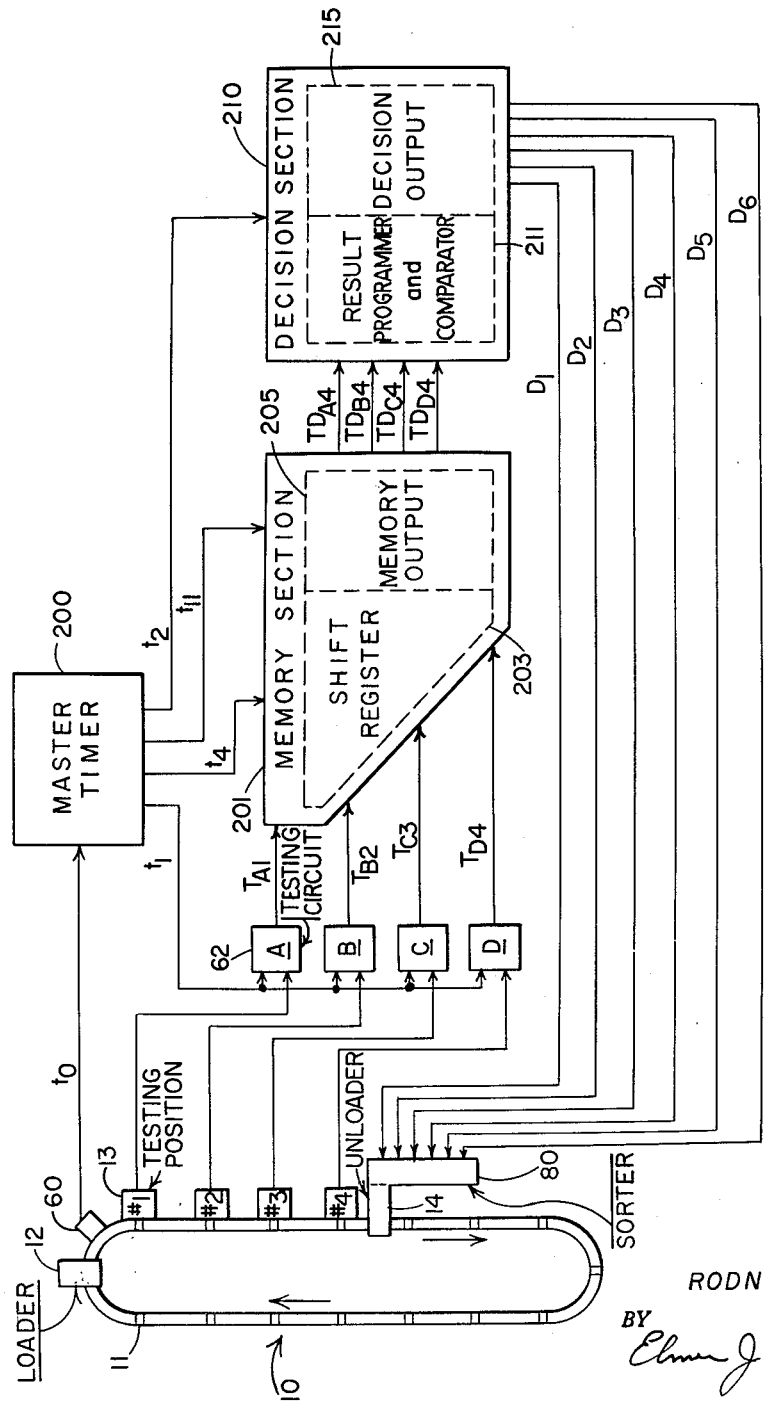
FIG. 11 is a diagrammatic representation of a second embodiment of a complete testing and sorting apparatus according to the invention.

*Testing and Sorting Apparatus of FIG. 11*

Figure 12:
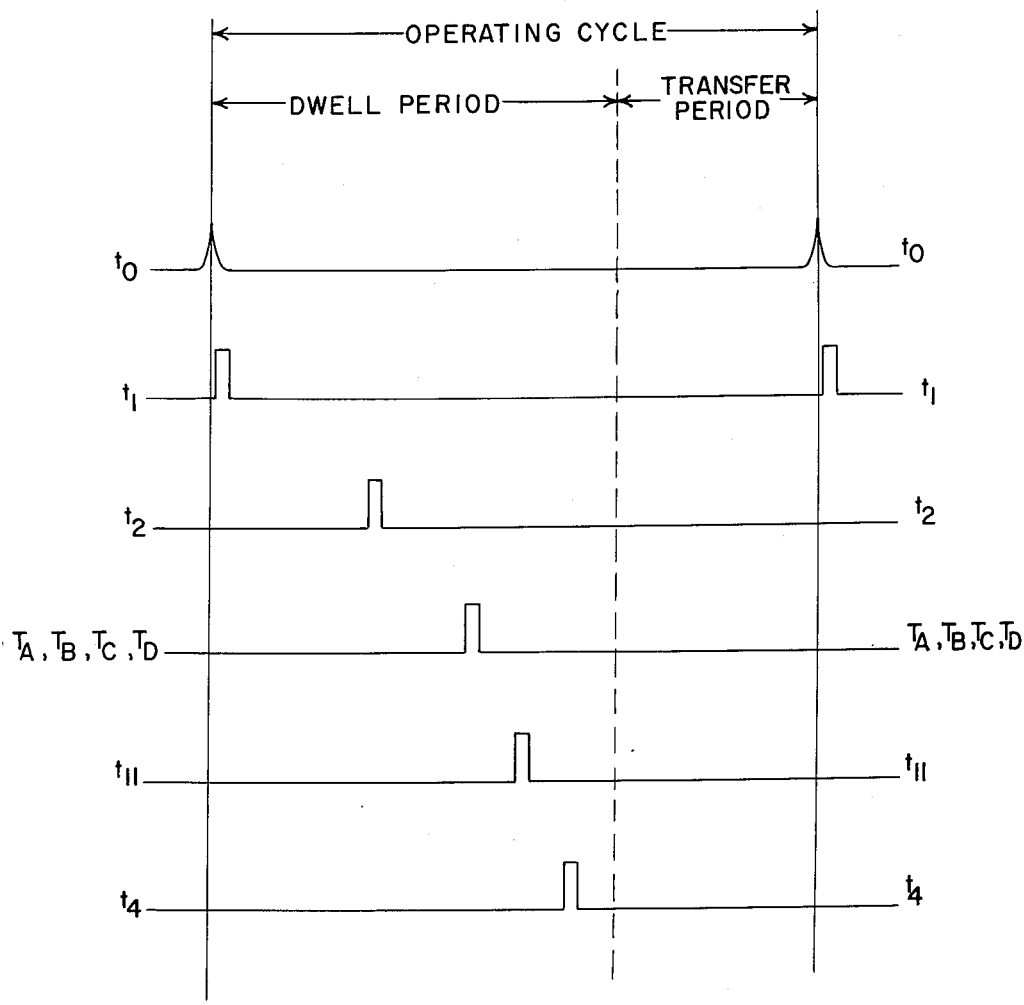
FIG. 12 is a set of graphs showing voltages occurring with respect to time during each operating cycle on the lines interconnecting various sections of the apparatus of FIG. 11.
Figure 13:
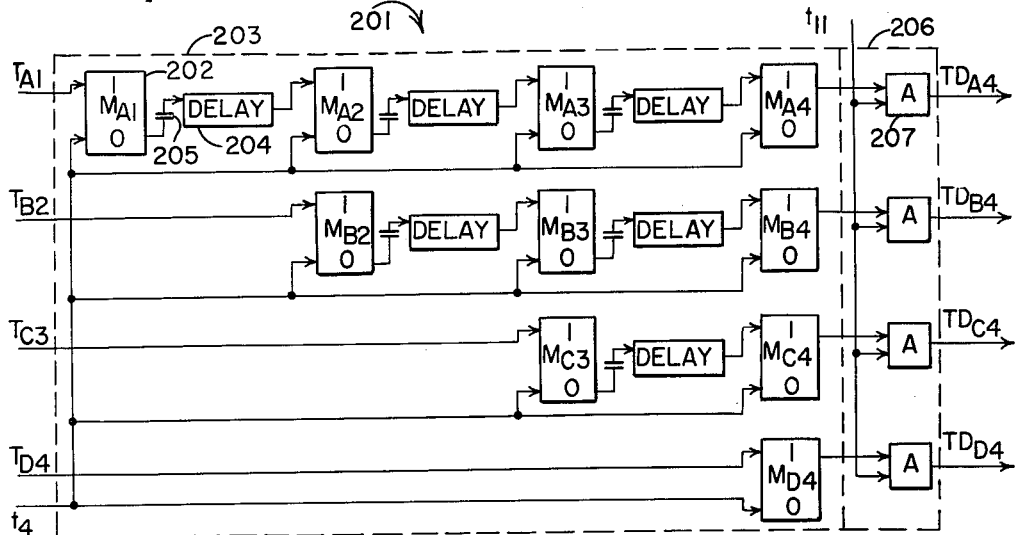
FIG. 13 is a logic diagram of the memory section of the apparatus of FIG. 11.
Figure 14:
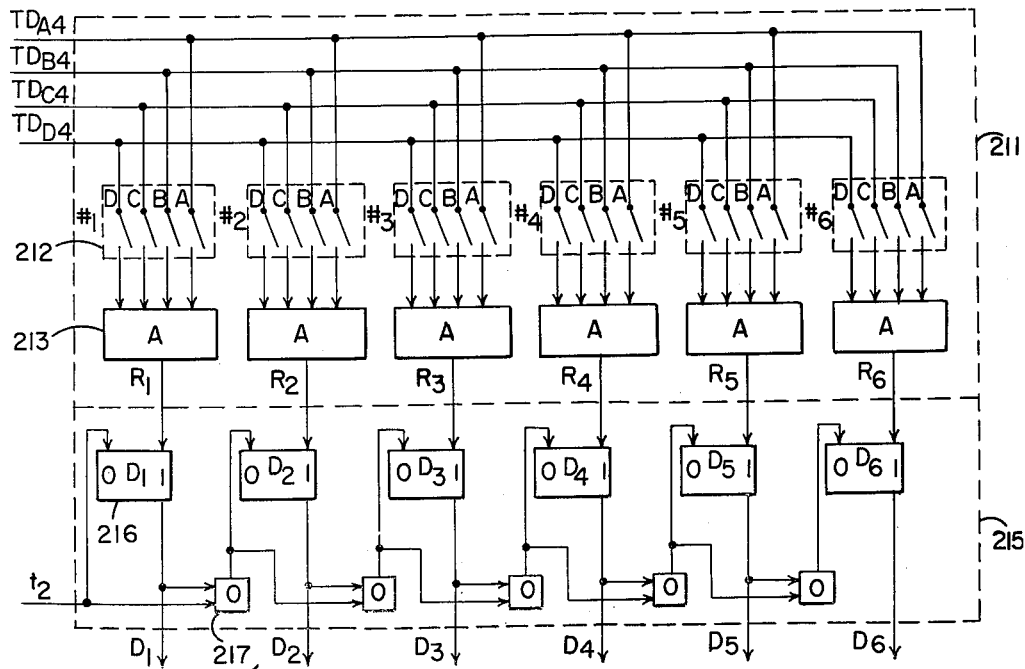
FIG. 14 is a logic diagram of the decision section of the apparatus of FIG. 11.

Another form of testing and sorting apparatus according to the invention, shown in diagrammatic form in FIG. 11, makes possible the elimination of the memory input and output selector and the comparator scanner. The pulses occurring on lines interconnecting various sections of the apparatus are shown in the graphs of FIG. 12. The logic arrangement of the memory section and the decision section of this embodiment are shown in detail in FIGS. 13 and 14, respectively. Wherever elements or functions in the embodiment of FIG. 11 are similar to those of the embodiment of FIG. 1, similar nomenclature and symbols are employed in the discussion and the drawings.

As the conveyor 10 moves into position at the end of a transfer period, the indexing switch 60 produces a pulse on line $t_0$ in the same manner as in the apparatus of FIG. 1. This pulse actuates the master timer 200 which provides a pulse on line $t_1$ initiating the testing cycle controlled by the programmer in each of the testing circuits 62, designated A, B, C, and D. A pulse from the master timer on line $t_2$ clears the decision output prior to the time indications of the test results are transmitted over lines $T_{A1}$, $T_{B2}$, $T_{C3}$, and $T_{D4}$ to the memory section 201 shown in FIG. 13. These lines are connected to flip-flops 202 designated as $M_{A1}$, $M_{B2}$, $M_{C3}$, and $M_{D4}$, respectively, which serve as the first memory elements in a shift register 203. All the flip-flops in the register are labeled with appropriate subscripts which designate for which test and for the diode in which test position test data is being stored. The flip-flops for each one of the four tests are connected in series, with a delay network 204 between each two flip-flops. The "0" output of each flip-flop, except for those recording information on the diode in the 4 test position, is connected to the delay network so as to provide a single output pulse as the flip-flop is switched to the "0" state from the "1" state. This action is indicated by the capacitance symbol 205 at each "0" output.

The shift register 203 records the results of each test on each diode in the appropriate flip-flop, and shifts the data from one flip-flop to the next flop-flop near the end of each dwell period. Thus, all of the test data for the diode in the 4 test position is recorded in $M_{A4}$, $M_{B4}$, $M_{C4}$, and $M_{D4}$ upon the completion of a testing cycle. While a diode is in the 1 test position it is subjected to test A. If it passes that test, a pulse is transmitted over line $T_{A1}$ and switches flip-flop $M_{A1}$ from its cleared "0" state to the "1" state. The absence of a pulse indicating that the diode has failed test A, in effect, causes "0" to be recorded in flip-flop $M_{A1}$. After the test data on the diode in the 4 test position has been read out and compared with the preset sets of requirements in a manner to be explained hereinbelow, a pulse is transmitted from the master timer 200 on line $t_4$ to the "0" input of all the flip-flops in the shift register. This pulse switches all the flip-flops to the "0" state, and if a flip-flop was in the "1" state, a pulse is transmitted through the delay circuit to the "1" input of the next flip-flop in series thus switching it to the "1" state. The period of the delay must, of course, be greater than the time duration of the pulse on line $t_4$. The foregoing action thus shifts the A test data on the diode in the 1 test position from flip-flop $M_{A1}$ to flip-flop $M_{A2}$. After the next transfer period the diode is in the 2 test position and is subjected to test B. The data on this test is recorded in flip-flop $M_{B2}$. Before the diode is transferred again, a pulse on line $t_4$ shifts the test data accumulated on the diode from flip-flop $M_{A2}$ to flip-flop $M_{A3}$ and from flip-flop $M_{B2}$ to flip-flop $M_{B3}$. Thus, after the diode has been moved to the 4 test position and has been subjected to test D, all the test data relating to that diode is recorded in flip-flops $M_{A4}$, $M_{B4}$, $M_{C4}$, and $M_{D4}$.

The stored information on the diode in the 4 test position is read out of the appropriate flip-flops through the memory output 206. The memory output includes four "and" logic circuits 207, each having an input connected to the "1" output of a different one of the flip-flops $M_{A4}$ through $M_{D4}$. The other input for each "and" circuit is conencted to line $t_{11}$ from the master timer 200. After the testing cycle has been completed and the test data recorded in the shift register flip-flops, a pulse occurs on line $t_{11}$. The information stored in flip-flops $M_{A4}$, $M_{B4}$, $M_{C4}$, and $M_{D4}$ is thus transmitted in pulse form over lines $TD_{A4}$, $TD_{B4}$, $TD_{C4}$, and $TD_{D4}$, respectively, to the decision section 210 shown in FIG. 14.

In this second embodiment of the invention the decision section has no comparator input other than the memory output. Instead lines $TD_{A4}$ through $TD_{D4}$ lead directly to the result programmer and comparator 211, which is the same as that employed in the first embodiment shown in FIG. 1. Each of the four input lines $TD_{A4}$ through $TD_{D4}$ is connected to six switches, one switch in each of the six banks of switches 212. Six sets of requirements are programmed into the six banks of switches as in the previous embodiment with the most desirable result being set in the 1 bank. Each of the switches in the 1 bank is connected to an "and" logic circuit 213 which produces a pulse on its output line $R_1$ coincident with the pulse on line $t_{11}$ if the diode in the 4 test position meets the requirements set into the 1 bank of switches. Pulses also occur at the same time on comparator output lines $R_2$ through $R_6$ from the "and" logic circuits associated with each of the other banks of switches for the sets of requirements which are satisfied by the diode.

Since the output pulses from the result programmer and comparator appear simultaneously on each of lines $R_1$ through $R_6$ for which a set of requirements is fulfilled, the logic arrangement of the decision output 215 differs from that in the first embodiment. Each of the comparator output lines leads to the "1" input of a different flip-flop 216 labeled $D_1$ through $D_6$. The "1" outputs $D_1$ through D of these flip-flops are connected through an array of "or" logic circuits 217 to the "0" inputs of the flip-flops in such a way that if any flip-flop is in the "1" state it tends to switch all higher numbered flip-flops to the "0" state. Thus, although more than one flip-flop may be switched to the "1" state by the simultaneously occurring pulses on the lines $R_1$ through $R_6$, upon cessation of the pulses the lowest numbered flip-flop which is in the "1" state will cause all of the other flip-flops to be switched to the "0" state. As mentioned hereinabove, after the cessation of the pulse on line $t_{11}$ and the activation of one, or possibly none, of the decision flip-flops, a pulse on line $t_4$ causes the information recorded in the shift register 203 to shift. This action removes the data on the diode in the 4 test position from the register and prepares the register for the next testing cycle.

The steady signal on one of the decision output lines $D_1$ through $D_6$ activates an appropriate solenoid in the sorting mechanism 80. Unloading of the diode from its carrier is accomplished at the unloading station 14 during the next transfer period. The diode is thus deposited at one of six locations corresponding to the set of requirements satisfied, or in the seventh location if no set of requirements is satisfied. The decision output flip-flop is reset to the "0" state by a pulse on line $t_2$ from the master timer 200 during the subsequent dwell period just prior to the time test data is transmitted to the memory section over lines $T_{A1}$ through $T_{D4}$.

It is believed apparent from the foregoing description and explanation that improved apparatus for testing elements to a set of characteristics and then physically sorting them into a plurality of categories depending on the characteristics each element possesses has been provided. The apparatus permits flexibility in the results programmed, in the tests performed, and also in the kinds and types of elements to be tested. It will also be appreciated that although only two embodiments of the invention have been shown and described in detail, various modifications of the apparatus are possible without departing from the teachings presented herein.

What is claimed is:

1. Apparatus for subjecting elements to a plurality of successive tests and classifying the elements in accordance with the results of said tests, said apparatus including carrying means for positioning an element in sequence in each of a plurality of test positions, testing means for subjecting an element to a test procedure at each of said test positions, memory means for storing an indication of the results of each of said test procedures on an individual element, readout means for comparing the results of said test procedures on an individual element stored in said memory means with each of a plurality of sets of desired results, and output means for indicating a set of desired results satisfied by the element.

2. Apparatus for subjecting elements to a plurality of successive tests and physically sorting the elements in accordance with the results of said tests, said apparatus including carrying means for positioning an element in sequence in each of a plurality of test positions, testing means for subjecting an element to a test procedure at each of said test positions, memory means for storing an indication of the result of each of said test procedures on an individual element, readout means for comparing the results of said test procedures on an individual element stored in said memory means with each of a plurality of sets of desired results, and sorting means for depositing the element at a particular location upon coincidence of the stored test results on said element and a particular set of desired results.

3. Apparatus for subjecting elements to a plurality of successive tests and physically sorting the elements in accordance with the results of said tests, said apparatus including carrying means for positioning an element in sequence in each of a plurality of test positions, testing means for subjecting an element to a test procedure at each of said test positions, memory means for storing an indication of the result of each of said test procedures on an individual element, readout means for comparing the results of said test procedures on an individual element stored in said memory means with each of a plurality of sets of desired results, a plurality of sorting locations, each location designating a particular one of said sets of desired results, and sorting means for depositing the element at a sorting location designating a set of desired results satisfied by the element upon coincidence of the stored test results and a set of desired results.

4. Apparatus for subjecting elements to a plurality of sucessive tests and physically sorting the elements in accordance with the results of said tests, said apparatus including element carrying means for positioning an element at each of a plurality of test positions in sequence, testing means for subjecting an element to a test procedure at each of said test positions, memory means for storing an indication of the result of each of said test procedures on an individual element until said element is positioned in the final one of said test positions and has been subjected to the final one of said test procedures, readout means for comparing the stored test results on said element with each of a plurality of sets of desired results, a plurality of sorting locations, each having an entrance thereto, each location designating a particular one of said sets of desired results, gating means for controlling the entrance to each of said sorting locations, actuating means for activating said gating means upon coincidence of said stored test results and a set of said desired results whereby the entrance to one sorting location designating a set of desired results satisfied by said element is opened, and depositing means for placing said element in the sorting location having the open entrance thereto subsequent to removal of said element from said final test position.

5. Apparatus for subjecting elements to a plurality of successive tests and physically sorting the elements in accordance with the results of said tests, said apparatus including element carrying means for positioning an element at each of a plurality of test positions in sequence, testing means for subjecting an element to a test procedure at each of said test positions, memory means for storing an indication of the result of each of said test procedures on an individual element until said element is positioned in the final one of said test positions and has been subjected to the final one of said test procedures, a plurality of sorting locations, each having an entrance thereto, selection means for presetting each of said locations to designate a set of desired test results, gating means for controlling the entrance to each of said sorting locations, readout means for comparing the stored test results on said element with each of said sets of desired test results, actuating means for activating said gating means upon coincidence of the stored test results on said element and a set of said desired results whereby the entrance to one sorting location designating a set of desired results satisfied by said element is opened, and depositing means for placing said element in the sorting location having the open entrance thereto.

6. Apparatus for subjecting elements to a plurality of successive tests and physically sorting the elements in accordance with the results of said tests, said apparatus including a plurality of test positions, carrying means for placing elements in each of said test positions simultaneously and for placing each element in each of said test positions in sequence, testing means for subjecting each element to a test procedure at each of said test positions, a memory means including a plurality of memory elements, memory input means for causing an indication of the result of each test procedure on each element to be recorded in a memory element, a plurality of sorting locations, each having an entrance thereto, selection means for presetting each of said locations to designate a set of desired test results, gating means for controlling the entrance to each of said sorting locations, readout means for comparing the test results recorded in the memory elements for an element which has been subjected to the final one of said test procedures with each of said sets of desired test results, actuating means for activating said gating means upon coincidence of the recorded test results on said element and a set of said desired test results whereby the entrance to one sorting location designating a set of desired results satisfied by said element is opened, and depositing means for placing said element in the sorting location having the open entrance thereto subsequent to removal of said element from said final test position by said carrying means.

7. Apparatus for subjecting elements to a plurality of successive tests and physically sorting the elements in accordance with the results of said tests, said apparatus including a plurality of test positions, carrying means for placing elements in each of said test positions simultaneously and for placing each element in each of said test positions in sequence, testing means for subjecting each element to a test procedure at each of said test positions, a memory means having a plurality of memory elements, memory input means for causing an indication of the result of each test procedure on each element to be recorded in a memory element, memory output means for reading out of the memory elements the test results on an element which has been subjected to the final one of said test procedures, a plurality of sorting locations, each having an entrance thereto, a gating means associated with each of said sorting locations for opening the entrance thereto, programming means adapted to have preset therein a plurality of sets of desired test results, control means associating each of said sets of desired test results with one of said gating means, thus identifying each of the sorting locations with a particular set of desired test results, comparison means for comparing the test results read out of said memory elements with each of the programmed sets of desired test results, said control means activating a gating means to open the entrance to a sorting location identified with a set of desired results satisfied by the test results read out of said memory elements, and depositing means for placing said element in the sorting location having the entrance thereto open subsequent to removal of said element from said final test position by said carrying means.

8. Apparatus for subjecting elements to a plurality of successive tests and physically sorting the elements in accordance with the results of said tests, said apparatus including a plurality of test positions, carrying means for placing elements in each of said test positions simultaneously and for placing each element in each of said test positions in sequence, testing means for subjecting each element to a test procedure at each of said test positions and for producing an indication of the result of each test performed, a memory means having a plurality of individual memory elements for receiving said indications, each indication being recorded in one of said memory elements, memory input means for directing each indication to a particular one of said memory elements, memory output means for reading out from said particular memory elements the test results recorded therein on an element which has been subjected to the final one of said test procedures, a plurality of sorting locations, each having an entrance thereto, a gating means associated with each of said sorting locations for opening the entrance thereto, programming means adapted to have preset therein a plurality of sets of desired test results, a control means associating each of said sets of desired test results with one of said gating means, thus identifying each of the sorting locations with a particular set of desired test results, comparison means for comparing the test results read out of said memory elements with each of the programmed sets of desired test results, one of said control means associated with a set of desired test results satisfied by the test results read out of said memory elements activating its associated gating means upon coincidence of a set of desired test results and the test results read out of said memory elements thereby to open the entrance to a sorting location identified with a set of desired test results satisfied by the test results read out of said memory elements, and depositing means for placing said element in the sorting location having the entrance thereto open subsequent to removal of said element from the final test position by said carrying means.

9. Apparatus for subjecting elements to a plurality of successive tests and physically sorting the elements in accordance with the results of said tests, said apparatus including a plurality of test positions, carrying means for placing elements in each of said test positions simultaneously and for placing each element in each of said test positions in sequence, testing means for subjecting each element to a test procedure at each of said test positions and for producing an indication of the result of each test performed, a memory means having a plurality of bistable memory elements, the number of said memory elements being equal to the square of the number of test positions, memory input means for connecting said testing means to said memory means, memory selector means for controlling said memory input means to direct each indication of a test result to a particular memory element for recording of the test result therein, memory output means for reading out test results recorded in said memory means, said memory selector means also controlling said memory output means for reading out the test results recorded in the memory elements having test results on the element which is in the final test position recorded therein, a plurality of sorting locations each having an entrance thereto, a gating means associated with each of said sorting locations for opening the entrance thereto, programming means adapted to have preset therein a plurality of sets of desired test results, a control means associating each of said sets of desired test results with one of said gating means, thus identifying each of the sorting locations with a particular set of desired test results, comparison means for comparing the test results read out of said memory elements with each of the programmed sets of desired test results, one of said control means associated with a set of desired test results satisfied by the test results read out of said memory elements activating its associated gating means upon coincidence of a set of desired test results and the test results read out of said memory elements thereby to open the entrance to a sorting location identified with a set of desired results satisfied by the test results read out of said memory elements, and depositing means for placing said element in the sorting location having the entrance thereto open subsequent to removal of said element from said final test position by said carrying means.

10. Apparatus for subjecting elements to a plurality of successive tests and physically sorting the elements in accordance with the results of said tests, said apparatus including a plurality of test positions, carrying means for placing elements in each of said test positions simultaneously and for placing each element in each of said test positions in sequence, testing means for subjecting each element to a test procedure at each of said test positions, a memory means having a plurality of memory elements, memory input means for causing an indication of the result of each test procedure on each element to be recorded in a memory element, memory output means for reading out of the memory elements the test results on an element which has been subjected to the final one of said test procedures, a plurality of sorting locations each having an entrance thereto, a gating means associated with each of said sorting locations for opening the entrance thereto, programming means adapted to have preset therein a plurality of sets of desired test results, a control means associating each of said sets of desired test results with one of said gating means, thus identifying each of the sorting locations with a particular set of desired test results, comparison means for comparing the test results read out of said memory elements with each of the programmed sets of desired test results, comparison input means for conducting the test results read out of said memory elements to said comparison means, scanner means for controlling said comparison input means to cause the test results read out of said memory elements to be compared with each of the programmed sets of desired test results in sequence, coincidence of the test results read out of said memory elements and one set of desired test results causing the control means associated with said one set of desired test results to activate its associated gating means and thereby open the entrance to the sorting location identified with the one set of desired results, said control means including inactivating means for preventing the control means associated with programmed sets of desired results compared with the test results read out of said memory elements subsequent to the one set of desired results from activating their associated gating means, and depositing means for placing said element in the final test position in the sorting location having the entrance thereto open subsequent to removal of said element from said final test position by the carrying means.

11. Apparatus for subjecting elements to a plurality of successive tests and physically sorting the elements in accordance with the results of said tests, said apparatus including a plurality of test positions, carrying means for placing elements in each of said test positions simultaneously and for placing each element in each of said test positions in sequence, testing means for subjecting each element to a test procedure at each of said test positions and for producing an indication of the result of each test performed, a memory means having a plurality of bistable memory elements, the number of said memory elements being equal to the square of the number of test positions, memory input means for connecting said testing means to said memory means, memory selector means for controlling said memory input means to direct each indication of a test result to a particular memory element for recording of the test result therein, memory output means for reading out test results recorded in said memory means, said memory selector means also controlling said memory output means for reading out the test results recorded in the memory elements having test results on the element which is in the final test position recorded therein, a plurality of sorting locations, each having an entrance thereto, a gating means associated with each of said sorting locations for opening the entrance thereto, programming means adapted to have preset therein a plurality of sets of desired test results, a control means associating each of said sets of desired test results with one of said gating means, thus identifying each of the sorting locations with a particular set of desired test results, comparison means for comparing the test results read out of said memory elements with each of the programmed sets of desired test results, comparison input means for conducting the test results read out of said memory elements to said comparison means, scanner means for controlling said comparison input means to cause the test results read out of said memory elements to be compared with each of the programmed sets of desired test results in sequence, coincidence of the test results read out of said memory elements and one set of desired test results causing the control means associated with said one set of desired test results to activate its associated gating means and thereby open the entrance to the sorting location identified with the one set of desired results, said control means including inactivating means for preventing the control means associated with programmed sets of desired results compared with the test results read out of said memory elements subsequent to the one set of desired test results from activating their associated gating means, and depositing means for placing said element in the final test position in the sorting location having the entrance thereto open subsequent to removal of said element from said final test position by the carrying means.

12. Apparatus for subjecting elements to a plurality of successive tests and physically sorting the elements in accordance with the results of said tests, said apparatus including a series of test positions, a conveyor mechanism for carrying a plurality of elements and having an operating cycle so that each of said test positions has a different element placed therein during each operating cycle and each element is placed in the next of said series of test positions during each successive operating cycle, sequential timing means activated by the conveyor mechanism for producing a series of actuating signals during each operating cycle of the conveyor mechanism while elements are located in the test positions, testing means actuated by a signal from the sequential timing means for subjecting each element to a test procedure at each of said test positions and for producing an indication in binary logic form of the result of each test performed, a memory means having a plurality of bistable memory elements, the number of said memory elements being equal to the square of the number of test positions, memory input means having an "and" logic circuit associated with each of said memory elements and connected to said testing means, memory selector means responsive to a signal from the sequential timing means for controlling said "and" logic circuits to direct each indication of a test result from said testing means to a particular memory element, the memory element recording the result of a test by being placed in one of two stable states by the indication received, memory output means having an "and" logic circuit associated with each of said memory elements, said memory selector means controlling the "and" logic circuits to read out the memory elements having test results on the element in the final test position recorded therein, a plurality of programming means adapted to have preset therein a plurality of sets of desired test results, a comparator means associated with each of said programming means for comparing the set of desired results therein with the test results read out of said memory elements and for producing an output upon coincidence of the set of desired test results and the test results read out of said memory elements, comparator input means having a group of "and" logic circuits associated with each of said comparator means for conducting the test results read out of the memory elements to the comparator means, scanner means actuated by a signal from the sequential timing means occurring subsequent to the producing of indications of the results of tests performed by the testing means for activating each group of "and" logic circuits in sequence causing the test results read out of said memory elements to be compared with each set of desired test results in sequence, an output being produced in succession from each comparator means associated with a programming means having a set of desired results satisfied by the test results read out of the memory elements, a plurality of thyratron tubes, the control grid of each thyratron being connected to the output of one of said comparator means, a solenoid arrangement connected in the anode circuit of each of said thyratrons, a sorting mechanism having a plurality of sorting locations each having an entrance thereto controlled by a gate arrangement, each of said gate arrangements being associated with one of said solenoid arrangements whereby conduction through a thyratron activates the associated solenoid arrangement and opens the associated gate arrangement to a sorting location, the cathodes of said thyratrons being connected to a common biasing means whereby current flow through one thyratron increases the cathode potential on all the thyratrons thus preventing the other thyratrons from being triggered to conduction by an output from a comparator, the first output produced by a comparator means thus causing conduction through its associated thyratron and opening of the entrance to its associated sorting location and preventing conduction in all the other thyratrons, a memory reset means controlled by said memory selector means and actuated by a signal from the sequential timing means occurring subsequent to activation of the groups of "and" logic circuits of said comparator input means by said scanner means for switching the memory elements having test results on the element in the final test position recorded therein to the stable state existing prior to the recording of test results therein, unloading means for separating said element from said conveyor mechanism upon removal of said element from said final test position by said conveyor mechanism and for depositing said element in said sorting mechanism whereby said element is placed in the sorting location associated with the programmed set of desired results first to be satisfied by the element, and thyratron reset means actuated by a signal from the sequential timing means for stopping conduction through a thyratron subsequent to the placing of the element in a sorting location.

13. Apparatus for subjecting semiconductor devices to a plurality of successive tests and then physically sorting the devices in accordance with the results of said tests, said apparatus including a loading position and a plurality of test positions, a conveyor mechanism having a plurality of carriers and an operating cycle including a dwell period during which a carrier is in place at each of said positions and a transfer period during which each carrier is moved from one position to the next position in sequence, loading means for placing a single device in each carrier as it is presented at the loading position, a source of sequentially timed signals activated by the conveyor mechanism upon completion of a transfer period for producing a series of actuating signals during each dwell period of an operating cycle, individual test circuits for connection to the devices at said test positions and for subjecting each device to a test procedure during each dwell period upon being actuated by a signal from the source of sequentially timed signals, each test circuit including output means for producing a pulse prior to the termination of said test procedure as an indication that the device passes the test and for producing no pulse as an indication that the device fails the test, a memory system having a plurality of flip-flops, the number of said flip-flops being equal to the square of the number of test positions, said flip-flops each having a "1" stable state and a "0" stable state and being in said "0" state when cleared of information, a memory input including an "and" logic circuit connected to each flip-flop, said "and" circuits being arranged in a number of groups equal to the number of test positions and each group having a number of "and" circuits equal to the number of test positions, the output means of each of said test circuits being connected to an input of one "and" circuit in each of a group of "and" circuits, a memory selector having a number of selector output lines equal to the number of test positions, each line being connected to an input of each of the "and" circuits in a group, said memory selector energizing a different one of its selector output lines during each operating cycle in response to a signal from the source of sequentially timed signals occurring prior to the completion of the test procedure for directing indications of tests results for devices at the test positions to particular flip-flops which are in the "0" state, a pulse from a test circuit output means switching a flip-flop to the "1" state and no pulse causing the flip-flop to remain in the "0" state, a memory output including an "and" logic circuit connected to the output of each of said flip-flops, said selector output lines being connected to the "and" circuits whereby the selector output line energized by said memory selector causes the flip-flops having recorded therein indications of the test results on the device in the final test position to be read out through the "and" circuits connected to the energized selector output line, a plurality of banks of programming switches for programming a like plurality of sets of desired test results therein by the closing of switches, each bank having a number of switches equal to the number of test positions, a comparator input including a group of "and" logic circuits associated with each of said banks of switches, the output of each "and" circuit being connected to a switch, each of the test results read out of a flip-flop being applied to the input of one "and" circuit in each of said groups of "and" circuits, a comparator "and" logic circuit connected to all the switches in each bank of switches and having a comparator output therefrom for providing a signal only upon coincidence of signals through all the closed switches connected thereto, a scanner having a scanner output to each group of "and" circuits in the comparator input for activating all the "and" circuits in a group and for activating each group in sequence, said scanner being actuated by a signal from the source of sequentially timed signals occurring subsequent to completion of the test procedure to perform a comparison cycle by activating each group of "and" circuits in sequence for comparing the test results read out of the flip-flops with each of the sets of desired results as programmed in each bank of switches and for providing a signal in sequence on each comparator output associated with a bank of switches wherein a programmed set of desired results is satisfied by the test results read out of the flip-flops, a plurality of thyratron tubes, the control grid of a thyratron being connected to each of said comparator outputs, a solenoid arrangement connected in series in the anode circuit of each thyratron, a sorting mechanism having a plurality of sorting locations each having an entrance thereto controlled by a gate arrangement, each of said gate arrangements being controlled by one of said solenoid arrangements whereby current flow through a thyratron activates the solenoid arrangement causing the associated gate arrangement to open and provide an entrance to a sorting location, the cathodes of said thyratrons being connected together and to the intermediate contact of a voltage divider a portion of which is in all the anode circuits, current flow through one thyratron thus changing the cathode blasting potential and preventing signals on the comparator outputs from triggering additional thyratrons, the first comparator output to provide a signal during each comparison cycle causing current flow through its associated thyratron and opening of the entrance to the associated sorting location and prevention of current flow through all the other thyratrons, a memory reset means controlled by the energized selector output line and actuated by a signal from the source of sequentially timed signals for switching the flip-flops having test results on the device in the final test position recorded therein to the "0" state subsequent to the completion of the comparison cycle, unloading means for removing a device from its carrier upon movement of the device from the final test position during the subsequent transfer period and for depositing the device in the sorting mechanism whereby the device drops in the sorting location associated with the programmed set of desired results first to be satisfied by the device during the comparison cycle, and reset means actuated by a signal from the source of sequentially timed signals for stopping current flow through a conducting thyratron during the dwell period subsequent to the transfer period.

14. Apparatus for subjecting elements to a plurality of successive tests and physically sorting the elements in accordance with the results of said tests, said apparatus including a plurality of test positions, carrying means for placing elements in each of said test positions simultaneously and for placing each element in each of said test positions in sequence, testing means for subjecting each element to a test procedure at each of said test positions and for producing an indication of the result of each test performed, a memory means having a plurality of bistable memory elements, said memory elements forming a shift register array associated with said testing means for recording indications of test results, shifting means for shifting indications from one memory element to another so that indications of all test results on the element in the final test position are recorded in a final group of memory elements corresponding in number to the number of test positions, memory output means for reading out the test results recorded in said group of memory elements, a plurality of sorting locations, each having an entrance thereto, a gating means associated with each of said sorting locations for opening the entrance thereto, programming means adapted to have preset therein a plurality of sets of desired test results, a control means associating each of said sets of desired test results with one of said gating means, thus identifying each of the sorting locations with a particular set of desired test results, comparison means for comparing the test results read out of said memory elements with each of the programmed sets of desired test results, one of said control means associated with a set of desired test results satisfied by the test results read out of said memory elements activating its associated gating means upon coincidence of a set of desired test results and the test results read out of said memory elements thereby to open the entrance to a sorting location identified with a set of desired results satisfied by the test results read out of said memory elements, and depositing means for placing said element in the sorting location having the entrance thereto open subsequent to removal of said element from said final test position by said carrying means.

15. Apparatus for subjecting elements to a plurality of successive tests and physically sorting the elements in accordance with the results of said tests, said apparatus including a plurality of test positions in series, carrying means for placing elements in each of said test positions simultaneously and for placing each element in each of said test positions in sequence, a corresponding series of testing means for subjecting each element to a test procedure at each of said test positions and for producing an indication of the result of each test performed, a memory means including a group of bistable memory elements for storing indications of test results on an element in the final one of said series of test positions, one of said group of memory elements being directly connected to the last in the series of said test means, said memory means also including a plurality of bistable memory elements forming a plurality of shift registers, each of said shift registers interconnecting a testing means and a respective one of said group of memory elements other than said one directly connected element of the group, shifting means for shifting indications of test results from one memory element to the next within each shift register until said results are recorded in a memory element of said group, memory output means for reading out the test results recorded in said group of memory elements, a plurality of sorting locations, each having an entrance thereto, a gating means associated with each of said sorting locations for opening the entrance thereto, programming means adapted to have preset therein a plurality of sets of desired test results, a control means associating each of said sets of desired test results with one of said gating means, thus identifying each of the sorting locations with a particular set of desired test results, comparison means for comparing the test results read out of said group of memory elements with each of the programmed sets of desired test results, coincidence of the test results read out of said group of memory elements and a set of desired test results causing the control means associated with each set of desired test results satisfied to be activated, said control means including inactivating means for preventing the activating of more than one of said control means after said test results have been read out of said group of memory elements, said one activated control means causing its associated gating means to open the entrance to the sorting location identified with the one set of desired test results, and depositing means for placing said element in the final test position in the sorting location having the entrance thereto opened subsequent to the removal of said element from said final test position by the carrying means.

16. A thyratron circuit arrangement including in combination a plurality of thyratrons, each thyratron having an anode, a cathode, and a control grid; an anode circuit connected to the anode of each of said thyratrons, said anode circuits including in common a cathode biasing resistance; a signal source connected to the control grids of each of said thyratrons for applying a pulse thereto, said pulses occurring in sequence, the first pulse applied to a grid of a thyratron triggering the thyratron and causing current to flow through the anode circuit of the thyratron thus changing the potential drop across the cathode biasing resistance and the potential on all of the cathodes whereby subsequent pulses applied to other control grids are prevented from triggering the thyratrons.

17. A thyratron circuit arrangement including in combination a plurality of thyratrons, each thyratron having an anode, a cathode, and a control grid; a direct-current potential source, the positive terminal of said potential source being connected through a different load impedance to the anode of each of said thyratrons; the cathodes of said thyratrons being connected together; a first resistance connected between the positive terminal of said potential source and the cathodes; a second resistance connected between said cathodes and ground; a signal source for applying a pulse at each of several of said control grids in sequence, whereby the first pulse from said signal source applied to the control grid of a thyratron causes current to flow from the potential source through the thyratron and through the second resistance thus increasing the potential on the cathodes and preventing subsequent pulses at the control grids from initiating current flow through the thyratrons.

References Cited in the file of this patent

UNITED STATES PATENTS

| | | |
|---|---|---|
| 2,645,343 | Nemir | July 14, 1953 |
| 2,858,018 | Alexander | Oct. 28, 1958 |